United States Patent
Ho et al.

(10) Patent No.: US 12,172,136 B2
(45) Date of Patent: Dec. 24, 2024

(54) GAS PERMEABLE MEMBRANES AND METHODS OF USING THEREOF

(71) Applicant: Ohio State Innovation Foundation, Columbus, OH (US)

(72) Inventors: W. S. Winston Ho, Columbus, OH (US); Yang Han, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 532 days.

(21) Appl. No.: 17/288,751

(22) PCT Filed: Oct. 28, 2019

(86) PCT No.: PCT/US2019/058331
§ 371 (c)(1),
(2) Date: Apr. 26, 2021

(87) PCT Pub. No.: WO2020/087067
PCT Pub. Date: Apr. 30, 2020

(65) Prior Publication Data
US 2021/0394127 A1   Dec. 23, 2021

Related U.S. Application Data

(60) Provisional application No. 62/751,529, filed on Oct. 26, 2018.

(51) Int. Cl.
*B01D 69/14* (2006.01)
*B01D 53/22* (2006.01)
(Continued)

(52) U.S. Cl.
CPC ......... *B01D 69/148* (2013.01); *B01D 53/228* (2013.01); *B01D 67/0006* (2013.01);
(Continued)

(58) Field of Classification Search
None
See application file for complete search history.

(56) References Cited

U.S. PATENT DOCUMENTS

2008/0290020 A1  11/2008  Marand et al.
2016/0199790 A1   7/2016  Usami et al.
(Continued)

FOREIGN PATENT DOCUMENTS

CN      107469635 A    12/2017
JP      2015083296 A    4/2015
(Continued)

OTHER PUBLICATIONS

Shen, Yijia et al., "Enhanced Performance of a Novel Polyvinyl Amine/Chitosan/Graphene Oxide Mixed Matrix Membrane for CO2 Capture", ACS Sustainable Chemistry and Engineering, 2015, 3, pp. 1819-1829. (Year: 2015).*

(Continued)

Primary Examiner — Jason M Greene
(74) Attorney, Agent, or Firm — Meunier Carlin & Curfman LLC

(57) ABSTRACT

Membranes, methods of making the membranes, and methods of using the membranes are described herein. The membrane can comprise a support layer; and a selective polymer layer disposed on the support layer. The selective polymer layer can comprise a selective polymer matrix (e.g., hydrophilic polymer, an amine-containing polymer, a low molecular weight amino compound, a $CO_2$-philic ether, or a combination thereof), and graphene oxide dispersed within the selective polymer matrix. The membranes can be used to separate carbon dioxide for hydrogen. Also provided are methods of purifying syngas using the membranes described herein.

19 Claims, 9 Drawing Sheets

(51) Int. Cl.
  B01D 67/00 (2006.01)
  B01D 69/02 (2006.01)
  B01D 69/10 (2006.01)
  B01D 69/12 (2006.01)
  B01D 71/02 (2006.01)
  B01D 71/60 (2006.01)
  C10K 1/00 (2006.01)

(52) U.S. Cl.
  CPC .......... B01D 69/02 (2013.01); B01D 69/107 (2022.08); B01D 69/125 (2013.01); B01D 71/0211 (2022.08); B01D 71/0212 (2022.08); B01D 71/601 (2022.08); C10K 1/004 (2013.01); B01D 2323/30 (2013.01); B01D 2325/341 (2022.08); B01D 2325/36 (2013.01)

(56) References Cited

U.S. PATENT DOCUMENTS

| | | | |
|---|---|---|---|
| 2016/0280563 A1* | 9/2016 | Raveendran-Nair | ........................ B01D 71/021 |
| 2017/0312695 A1 | 11/2017 | Majumder et al. | |
| 2018/0090777 A1* | 3/2018 | Pozzo ................. | B01D 69/148 |
| 2018/0147513 A1 | 5/2018 | Ho et al. | |

FOREIGN PATENT DOCUMENTS

| | | |
|---|---|---|
| JP | 2015160166 A | 9/2015 |
| JP | 2015160167 A | 9/2015 |
| WO | 2014/168629 A1 | 10/2014 |
| WO | 2015/075451 | 5/2015 |
| WO | 2016162518 A1 | 10/2016 |

OTHER PUBLICATIONS

Han, Yang et al., "Nanotube-reinforced facilitated transport membrane for CO2/N2 separation with vacuum operation", Journal of Membrane Science, 2018, 567, pp. 261-271. (Year: 2018).*

Li, Xueqin et al., "Synergistic effect of combining carbon nanotubes and graphene oxide in mixed matrix membranes for efficient CO2 separation", Journal of Membrane Science, 2015, 479, pp. 1-10. (Year: 2015).*

Ansaloni, Luca et al., "Facilitated transport membranes containing amino-functionalized multi-walled carbon nanotubes for high-pressure CO2 separations", Journal of Membrane Science, 2015, 490, pp. 18-28. (Year: 2015).*

Lin, Haiqing et al., "Materials selection guidelines for membranes that remove CO2 from gas mixtures", Journal of Molecular Structure, 2005, 739, pp. 57-74. (Year: 2005).*

Ansaloni, L., et al., "Facilitated transport membranes containing amino-functionalized multi-walled carbon nanotubes for high-pressure CO2 separations," Journal of Membrane Sciences, vol. 490, 2015, pp. 18-28.

Fout, T., et al., "Cost and Performance Baseline for Fossil Energy Plants vol. 1b: Bituminous Coal (IGCC) to Electricity Revision 2b—Year Dollar Update," National Energy Technology Laboratory Report, U.S. Department of Energy, 2015, 281 pages.

Han, Y., et al., "Nanotube-reinforced facilitated transport membrane for CO2/N2 separation with vacuum operation," Journal of Membrane Science, vol. 567, 2018, pp. 261-271.

Li, X., et al., "Synergistic effect of combining carbon nanotubes and graphene oxide in mixed matrix membranes for efficient CO2 separation," Journal of Membrane Science, vol. 479, 2015, 10 pages.

Lin, H., et al., "Materials selection guidelines for membranes that remove CO2 from gas mixtures," Journal of Molecular Structure, vol. 739, 2005, pp. 57-74.

Qiao, Z. et al., "Preparation and characterization of small molecular amine modified PVAm membranes for CO2/H2 separation," Journal of Membrane Science, vol. 475, 2015, pp. 290-302.

Ramasubramanian, K., et al., "CO2 Capture and H2 Purification: Prospects for CO2-Selective Membrane Processes," AIChE Journal, vol. 59, 2013, pp. 1033-1045.

Shen, Y., et al., "Enhanced Performance of a Novel Polyvinyl Amine/Chitosan/Graphene Oxide Mixed Matrix Membrane for CO2 Capture," ACS Sustainable Chemistry & Engineering, vol. 3, No. 8, 2015, pp. 1819-1829.

Xing, R., et al., "Crosslinked polyvinylalcohol-polysiloxane/fumed silica mixed matrix membranes containing amines for CO2/H2 separation," Journal of Membrane Sciences, vol. 367, 2011, pp. 91-102.

Zhao, Y., et al., "Multiwalled carbon nanotube mixed matrix membranes containing amines for high pressure CO2/H2 separation," Journal of Membrane Sciences, 2014, pp. 233-243.

Extended European Search Report, dated Jun. 22, 2022, received in connection with corresponding EP Patent Application No. 19875718.9.

International Search Report and Written Opinion issued by the International Searching Authority (ISA/US) in PCT Application No. PCT/US2019/058331 on Jan. 14, 2021, 9 pages.

European Patent Office. Office Action issued in EP Application No. 19875718.9. Jun. 28, 2023. 10 pages.

Japanese Patent Office. Office Action issued in JP Application No. 2021-522425. Oct. 24, 2023. 8 pages, including English translation.

* cited by examiner

GAS PERMEABLE MEMBRANES AND METHODS OF USING THEREOF

CROSS-REFERENCE TO RELATED APPLICATIONS

This application is a national stage application filed under 35 U.S.C. § 371 of PCT/US2019/058331 filed Oct. 26, 2019, which claims benefit of priority to U.S. Provisional Application No. 62/751,529, filed Oct. 26, 2018, which is incorporated by reference in its entirety.

STATEMENT REGARDING FEDERALLY SPONSORED RESEARCH OR DEVELOPMENT

The invention was made with government support under grant/contract number DE-FE0031635 awarded by the Department of Energy. The government has certain rights in the invention.

BACKGROUND

There has been growing concern about global warming since the $CO_2$ concentration in the atmosphere has surpassed 400 ppm in the past decade. The combustion of fossil fuels is one of the major contributors to the large amount of $CO_2$ emissions, and membrane technologies have been suggested as a promising approach to capture $CO_2$ from large stationary sources, followed by compression and geological sequestration. As one approach to produce large-scale electricity, coal can be gasified into a cleaner syngas, which can then be used to produce electricity via gas turbines or fuel cells. To capture $CO_2$ before deriving energy or to produce pure $H_2$ as a preferred chemical feedstock, the syngas can be subjected to a water-gas shift (WGS) reaction. In this scheme, typically named as integrated gasification combined cycle (IGCC), $CO_2$ has to be separated from $H_2$. Other minor components, include water vapor and $H_2S$, also needs to be removed. Accordingly, improved methods of separating $CO_2$ and $H_2$ are needed.

SUMMARY

Disclosed are membranes that comprise a support layer; and a selective polymer layer disposed on the support layer. The selective polymer layer can comprise a selective polymer matrix and graphene oxide dispersed within the selective polymer matrix.

The gas permeable support layer can comprise a gas permeable polymer. The gas permeable polymer can be a polymer selected from the group consisting of polyamides, polyimides, polypyrrolones, polyesters, sulfone-based polymers, polymeric organosilicones, fluorinated polymers, polyolefins, copolymers thereof, and blends thereof. In some embodiments, the gas permeable polymer comprises polyethersulfone. In certain cases, the gas permeable support layer comprises a gas permeable polymer disposed on a base (e.g., a nonwoven fabric such as a polyester nonwoven).

The selective polymer matrix can comprise a hydrophilic polymer, an amino compound (e.g., an amine-containing polymer, a low molecular weight amino compound, or a combination thereof), a $CO_2$-philic ether, or a combination thereof. In some embodiments, selective polymer matrix can comprise an amine-containing polymer (e.g., polyvinylamine), a hydrophilic polymer (e.g., polyvinyl alcohol), and a low molecular weight amino compound (e.g., PZEA-Sar, PZEA-AMA, HEP, or a combination thereof). In some embodiments, selective polymer matrix can comprise an amine-containing polymer (e.g., polyvinylamine), a hydrophilic polymer (e.g., polyvinyl alcohol), a low molecular weight amino compound (e.g., PZEA-Sar, PZEA-AMA, HEP, or a combination thereof), and a $CO_2$-philic ether (e.g., poly(ethylene glycol) dimethyl ether).

The graphene oxide can be any suitable form of graphene oxide. In some embodiments, the graphene oxide can be nanoporous. The selective polymer layer can comprise from 0.01% to 5% by weight graphene oxide, based on the total dry weight of the selective polymer layer.

The membranes can exhibit selective permeability towards gases, such as carbon dioxide. In certain embodiments, the selective polymer matrix can exhibit a $CO_2$:$H_2$ selectivity of at least 50 (e.g., from 50 to 500) at 107° C. and 31.7 bar feed pressure.

Also provided are methods for separating a first gas from a feed gas stream using the membranes described herein. These methods can comprise contacting a membrane described herein with the feed gas stream comprising the first gas under conditions effective to afford transmembrane permeation of the first gas. The feed gas can comprises hydrogen, carbon dioxide, hydrogen sulfide, hydrogen chloride, carbon monoxide, nitrogen, methane, steam, sulfur oxides, nitrogen oxides, or combinations thereof.

In some embodiments, the first gas is chosen from carbon dioxide, hydrogen sulfide, hydrogen chloride, and combinations thereof. In some of these embodiments, the feed gas can comprise a second gas selected from the group consisting of nitrogen, hydrogen, carbon monoxide, and combinations thereof, and wherein the membrane exhibits a first gas/second gas selectivity of from 20 to 300 at 107° C. and 31.7 bar feed pressure.

In certain embodiments, the feed gas comprises syngas. The first gas can comprise carbon dioxide and the second gas can comprise hydrogen. In these embodiments, the membranes described herein can be employed, for example, to decarbonize coal-derived syngas.

Also provided are methods of making a membrane that comprise depositing a selective polymer layer on a support layer, the selective polymer layer comprising a selective polymer matrix and graphene oxide dispersed within the selective polymer matrix.

DETAILED DESCRIPTION

Figure 1:
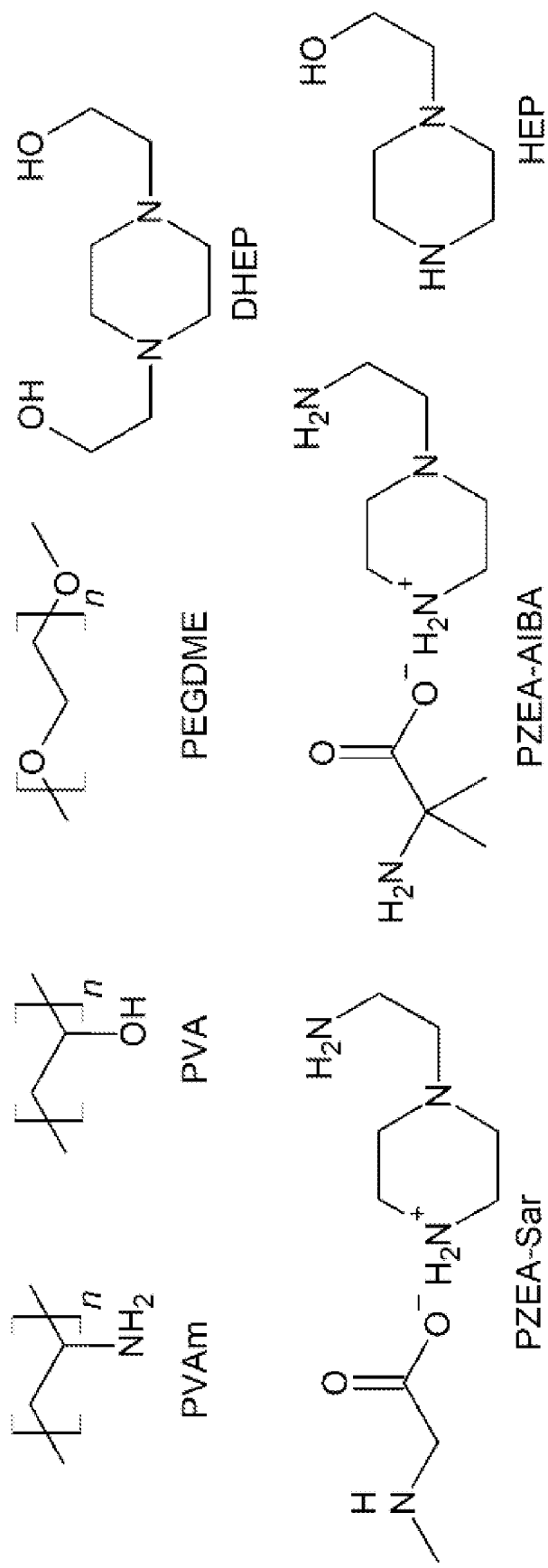
FIG. 1 shows the chemical structure of components used to form Membrane I, Membrane II, Membrane III, and Membrane IV.

Because of the high $CO_2/H_2$ selectivity, amine-containing polymeric membranes are a promising technology for efficient hydrogen purification. One benign factor of applying membrane to remove $CO_2$ in IGCC is that the syngas is typically delivered at a high pressure up to 50 bar with a considerable $CO_2$ concentration of 30-40%. The high $CO_2$ partial pressure provides a sufficient transmembrane driving force for selective $CO_2$ removal without incurring additional energy penalty. However, several engineering issues hinder the operation of amine-containing membranes at high feed pressure. Firstly, the $CO_2$ permeance of the membrane tends to reduce with increasing feed pressure, owing to the saturated amine carriers. Sophisticated understanding and design of the amine-$CO_2$ chemistry are required to achieve a highly selective membrane performance in the syngas separation modality. Secondly, the high feed pressure may compress the polymer material, which leads to membrane densification, thereby a reduced $CO_2$ permeance. Several inorganic nanofillers have been proposed to mitigate the membrane compaction, but none of them has demonstrated the feasibility at a feed pressure relevant to syngas purification.

Disclosed herein are membranes which possess extraordinary $CO_2/H_2$ separation performances at high $CO_2$ partial pressure. The selective layer of the membrane can include, for example, polyvinylamine and crosslinked polyvinylalcohol as the polymer matrix and small molecule amines as the mobile carrier to facilitate the transport of $CO_2$. In certain compositions, $CO_2$-philic moieties based on the ether group (—C—O—C—) are also incorporated to enhance the $CO_2$ solubility. To address the membrane compaction issue, a small amount of nanoporous graphene oxide is dispersed as a two-dimensional reinforcement filler. Finally, a single-stage membrane process is described to capture 90% $CO_2$ from IGCC while delivering a $H_2$ recovery of >99%.

Accordingly, membranes, methods of making the membranes, and methods of using the membranes are described herein. The membranes can comprise a support layer, and a selective polymer layer disposed on the support layer.

Support Layer

The support layer can be formed from any suitable material. The material used to form the support layer can be chosen based on the end use application of the membrane. In some embodiments, the support layer can comprise a gas permeable polymer. The gas permeable polymer can be a cross-linked polymer, a phase separated polymer, a porous condensed polymer, or a blend thereof. Examples of suitable gas permeable polymers include polyamides, polyimides, polypyrrolones, polyesters, sulfone-based polymers, nitrile-based polymers, polymeric organosilicones, fluorinated polymers, polyolefins, copolymers thereof, or blends thereof. Specific examples of polymers that can be present in the support layer include polydimethylsiloxane, polydiethylsiloxane, polydi-iso-propylsiloxane, polydiphenylsiloxane, polyethersulfone, polyphenylsulfone, polysulfone, polyacrylonitrile, polyvinylidene fluoride, polyamide, polyimide, polyetherimide, polyetheretherketone, polyphenylene oxide, polybenzimidazole, polypropylene, polyethylene, partially fluorinated, perfluorinated or sulfonated derivatives thereof, copolymers thereof, or blends thereof. In some embodiments, the gas permeable polymer can be polysulfone or polyethersulfone. If desired, the support layer can include inorganic particles to increase the mechanical strength without altering the permeability of the support layer.

In certain embodiments, the support layer can comprise a gas permeable polymer disposed on a base. The base can be in any configuration configured to facilitate formation of a membrane suitable for use in a particular application. For example, the base can be a flat disk, a tube, a spiral wound, or a hollow fiber base. The base can be formed from any suitable material. In some embodiments, the layer can include a fibrous material. The fibrous material in the base can be a mesh (e.g., a metal or polymer mesh), a woven or non-woven fabric, a glass, fiberglass, a resin, a screen (e.g., a metal or polymer screen). In certain embodiments, the base can include a non-woven fabric (e.g., a non-woven fabric comprising fibers formed from a polyester).

Selective Polymer Layer

The selective polymer layer can comprise a selective polymer matrix and graphene oxide dispersed within the selective polymer matrix. The selective polymer matrix can comprise a hydrophilic polymer, an amino compound (e.g., an amine-containing polymer, a low molecular weight amino compound, or a combination thereof), a $CO_2$-philic ether, or a combination thereof.

The selective polymer matrix can comprise a hydrophilic polymer, an amino compound, a $CO_2$-philic ether, or a combination thereof. In some embodiments, the hydrophilic polymer can be absent (e.g., the selective polymer matrix can comprise one or more amino compounds and/or one or more a $CO_2$-philic ethers). In other embodiments, the selective polymer matrix can comprise a combination of a hydrophilic polymer and an amino compound. For example, in some cases, the selective polymer matrix can comprise an amino compound (e.g., a small molecule, a polymer, or a combination thereof) dispersed in a hydrophilic polymer matrix. In other embodiments, the selective polymer matrix can comprise a combination of a hydrophilic polymer, an amino compound, and a $CO_2$-philic ethers. For example, in some cases, the selective polymer matrix can comprise an amino compound (e.g., a small molecule, a polymer, or a combination thereof) and a $CO_2$-philic ethers dispersed in a hydrophilic polymer matrix.

By way of example, in some embodiments, selective polymer matrix can comprise an amine-containing polymer (e.g., polyvinylamine), a hydrophilic polymer (e.g., polyvinyl alcohol), and a low molecular weight amino compound (e.g., PZEA-Sar, PZEA-AIBA, HEP, or a combination thereof). In some embodiments, selective polymer matrix can comprise an amine-containing polymer (e.g., polyvinylamine), a hydrophilic polymer (e.g., polyvinyl alcohol), a low molecular weight amino compound (e.g., PZEA-Sar, PZEA-AIBA, HEP, or a combination thereof), and a $CO_2$-philic ether (e.g., poly(ethylene glycol) dimethyl ether).

In some cases, the selective polymer layer can be a selective polymer matrix through which gas permeates via diffusion or facilitated diffusion. The selective polymer layer can comprise a selective polymer matrix having a $CO_2:H_2$ selectivity of at least 10 at 107° C. and 31.7 bar feed pressure. For example, the selective polymer matrix can have a $CO_2:H_2$ selectivity of at least 25 (e.g., at least 50, at least 75, at least 100, at least 125, at least 150, at least 175, at least 200, at least 225, at least 250, at least 275, at least 300, at least 325, at least 350, at least 375, at least 400, at least 425, at least 450, or at least 475) at 107° C. and 31.7 bar feed pressure. In some embodiments, the selective polymer matrix can have a $CO_2:H_2$ selectivity of 500 or less (e.g., 475 or less, 450 or less, 425 or less, 400 or less, 375 or less, 350 or less, 325 or less, 300 or less, 275 or less, 250 or less, 225 or less, 200 or less, 175 or less, 150 or less, 125 or less, 100 or less, 75 or less, 50 or less, or 25 or less) at 107° C. and 31.7 bar feed pressure.

In certain embodiments, the selective polymer layer can comprise a selective polymer matrix that has a $CO_2:H_2$ selectivity ranging from any of the minimum values described above to any of the maximum values described above. For example, in certain embodiments, the selective polymer layer can comprise a selective polymer matrix that has a $CO_2:H_2$ selectivity of from 10 to 500 at 107° C. and 31.7 bar feed pressure (e.g., from 10 to 400 at 107° C. and 31.7 bar feed pressure, from 75 to 400 at 107° C. and 31.7 bar feed pressure, from 100 to 400 at 107° C. and 31.7 bar feed pressure, from 10 to 350 at 107° C. and 31.7 bar feed pressure, from 75 to 350 at 107° C. and 31.7 bar feed pressure, from 100 to 350 at 107° C. and 31.7 bar feed pressure, from 10 to 250 at 107° C. and 31.7 bar feed pressure, from 75 to 250 at 107° C. and 31.7 bar feed pressure, or from 100 to 250 at 107° C. and 31.7 bar feed pressure). The $CO_2:H_2$ selectivity of the selective polymer can be measured using standard methods for measuring gas permeance known in the art, such as those described in the examples below.

Hydrophilic Polymers

The selective polymer matrix can include any suitable hydrophilic polymer. Examples of hydrophilic polymers suitable for use in the selective polymer layer can include polyvinylalcohol, polyvinylacetate, polyethylene oxide, polyvinylpyrrolidone, polyacrylamine, a polyamine such as polyallylamine, polyvinyl amine, or polyethylenimine, copolymers thereof, and blends thereof. In some embodiments, the hydrophilic polymer includes polyvinylalcohol.

When present, the hydrophilic polymer can have any suitable molecular weight. For example, the hydrophilic polymer can have a weight average molecular weight of from 15,000 Da to 2,000,000 Da (e.g., from 50,000 Da to 200,000 Da). In some embodiments, the hydrophilic polymer can include polyvinylalcohol having a weight average molecular weight of from 50,000 Da to 150,000 Da. In other embodiments, the hydrophilic polymer can be a high molecular weight hydrophilic polymer. For example, the hydrophilic polymer can have a weight average molecular weight of at least 500,000 Da (e.g., at least 700,000 Da, or at least 1,000,000 Da).

The selective polymer layer can comprise any suitable amount of the hydrophilic polymer. For example, in some cases, the selective polymer layer can comprise from 10% to 90% by weight (e.g., from 10% to 50% by weight, or from 10% to 30% by weight) hydrophilic polymer, based on the total weight of the components used to form the selective polymer layer.

Amino Compounds

In some embodiments, the amino compound can include a compound (e.g., a small molecule, a polymer, or a combination thereof) comprising one or more primary amine moieties and/or one or more secondary amine moieties. The amino compound can be, for example, an amine-containing polymer, a low molecular weight amino compound (i.e., a small molecule), or a combination thereof. In some embodiments, the selective polymer layer can comprise an amine-containing polymer and an amino acid salt. In these embodiments, the amine-containing polymer can serve as a "fixed carrier" and the amino acid salt can serve as a "mobile carrier."

In some embodiments, the amino compound comprises an amine-containing polymer (also referred to herein as a "fixed carrier"). The amine-containing polymer can have any suitable molecular weight. For example, the amine-containing polymer can have a weight average molecular weight of from 5,000 Da to 5,000,000 Da, or from 50,000 Da to 2,000,000 Da. Suitable examples of amine-containing polymers include, but are not limited to, polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof in some embodiments, the amine-containing polymer can comprise polyvinylamine (e.g., polyvinylamine having a weight average molecular weight of from 50,000 Da to 2,000,000 Da). In some embodiments when the amino compound comprises an amine-containing polymer, the hydrophilic polymer is absent. In some embodiments when the amino compound comprises an amine-containing polymer, the selective polymer layer can comprise a blend of an amine-containing polymer and a hydrophilic polymer (e.g., an amine-containing polymer dispersed in a hydrophilic polymer matrix).

In some embodiments, the amino compound can comprise a low molecular weight amino compound (also referred to herein as a "mobile carrier"), The low molecular weight amino compound can have a molecular weight of 1,000 Da or less (e.g., 800 Da or less, 500 or less. 300 Da or less, or 250 Da or less). In some embodiments, the low molecular weight amino compound can be non-volatile at the temperatures at which the membrane will be stored or used. For example, the low molecular weight amino compound can comprise a salt of a primary amine or a salt of a secondary amine. In some embodiments when the amino compound comprises a low molecular weight amino compound, the selective polymer layer can comprise a blend of the low molecular weight amino compound and a hydrophilic polymer (e.g., a low molecular weight amino compound dispersed in a hydrophilic polymer matrix).

In some cases, the low molecular weight amino compound can include an aminoacid salt. The amino acid salt can be a salt of any suitable amino acid. The amino acid salt may be derived, for instance, from glycine, arginine, lysine, histidine, 6-aminohexanoic acid, proline, sarcosine, methionine, or taurine. In some cases, the amino acid salt can comprise a salt of a compound defined by the formula below

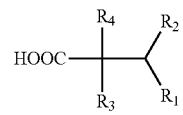

Wherein, independently for each occurrence in the amino acid, each of $R_1$, $R_2$, $R_3$ and $R_4$ is selected from one of the following

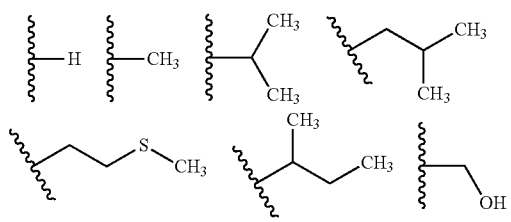

-continued

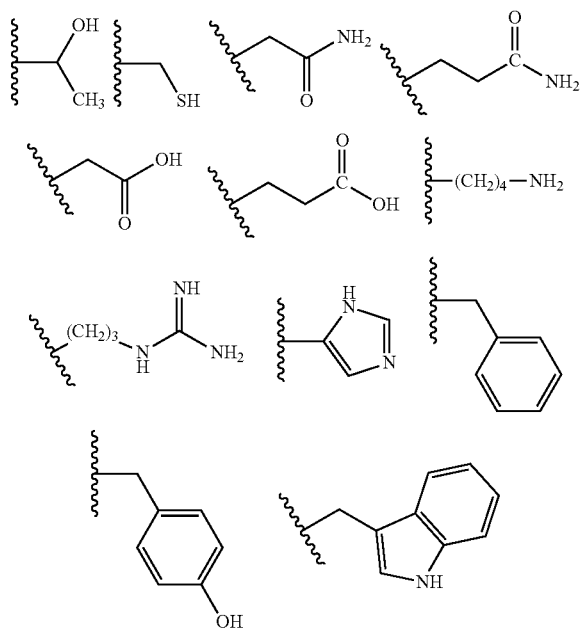

or $R_1$ and $R_3$, together with the atoms to which they are attached, form a five-membered heterocycle defined by the structure below when n is 1, or a six-membered heterocycle defined by the structure below when n is 2

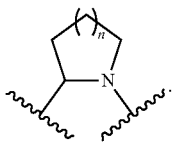

Poly(amino-acids), for example, polyarginine, polylysine, polyonithine, or polyhistidine may also be used to prepare the amino acid salt.

In other embodiments, the low molecular weight amino compound can be defined by a formula below

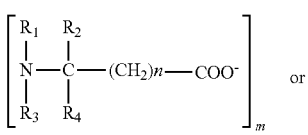

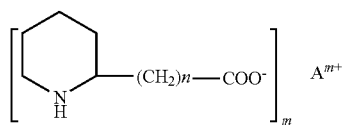

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3, In some cases, the cation ($A^{m+}$) can be an amine cation having the formula:

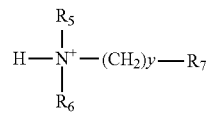

wherein $R_5$ and $R_6$ are hydrogen or hydrocarbon groups having from 1 to 4 carbon atoms, $R_7$ is hydrogen or hydrocarbon groups having from 1 to 4 carbon atoms or an alkyl amine of from to 6 carbon atoms and 1 to 4 nitrogen atoms, y is an integer ranging from 1 to 4, and m is an integer equal to the valence of the cation. In some embodiments, $A^{m+}$ is a metal cation selected from Groups Ia, IIa, and IIIa of the Periodic Table of Elements or a transition metal. For example, $A^{m+}$ can comprise lithium, aluminum, or iron.

Other suitable low molecular weight amino compounds include aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

$CO_2$-Philic Ethers

The selective polymeric matrix can further include a one or more $CO_2$-philic ethers. The $CO_2$-philic ether can be a polymer, oligomer, or small molecule containing one or more ether linkages. Examples of $CO_2$-philic ethers include alcohol ethers, polyalkylene alcohol ethers, polyalkylene glycols, poly(oxyalkylene)glycols, poly(oxyalkylene)glycol ethers, ethoxylated phenol. In one embodiment, the $CO_2$-philic ether can comprise alkyl ethoxylate (C1-C6)-XEO X=1-30-linear or branched. In some embodiments, the $CO_2$-philic ether can comprise ethylene glycol butyl ether (EGBE), diethylene glycol monobutyl ether (DGBE), triethylene glycol monobutyl ether (TEGBE), ethylene glycol dibutyl ether (EGDE), polyethylene glycol monomethyl ether (mPEG), or any combination thereof.

Graphene Oxide

The selective polymer layer can further include graphene oxide.

The term "graphene" refers to a one-atom-thick planar sheet of sp2-bonded carbon atoms that are densely packed in a honeycomb crystal lattice. In one embodiment, it refers to a single-layer version of graphite.

The term "graphene oxide" herein refers to functionalized graphene sheets (FGS)—the oxidized compositions of graphite. These compositions are not defined by a single stoichiometry. Rather, upon oxidation of graphite, oxygen-containing functional groups (e.g., epoxide, carboxyl, and hydroxyl groups) are introduced onto the graphite. Complete oxidation is not needed. Functionalized graphene generally refers to graphene oxide, where the atomic carbon to oxygen ratio starts at approximately 2. This ratio can be increased by reaction with components in a medium, which can comprise a polymer, a polymer monomer resin, or a solvent, and/or by the application of radiant energy. As the carbon to oxygen ratio becomes very large (e.g. approaching 20 or above), the graphene oxide chemical composition approaches that of pure graphene.

The term "graphite oxide" includes "graphene oxide", which is a morphological subset of graphite oxide in the form of planar sheets. "Graphene oxide" refers to a graphene oxide material comprising either single-layer sheets or multiple-layer sheets of graphite oxide. Additionally, in one embodiment, a graphene oxide refers to a graphene oxide material that contains at least one single layer sheet in a portion thereof and at least one multiple layer sheet in another portion thereof. Graphene oxide refers to a range of possible compositions and stoichiometries. The carbon to oxygen ratio in graphene oxide plays a role in determining the properties of the graphene oxide, as well as any composite polymers containing the graphene oxide.

The abbreviation "GO" is used herein to refer to graphene oxide, and the notation GO(m) refers to graphene oxide having a C:O ratio of approximately "m", where m ranges from 3 to about 20, inclusive. For example, graphene oxide having a C:O ratio of between 3 and 20 is referred to as "GO(3) to GO(20)", where m ranges from 3 to 20, e.g. m=3, 4, 5, 6, 7, 8, 9, 10, 11, 12, 13, 14, 15, 16, 17, 18, 19 or 20, including all decimal fractions of 0.1 increments in between, e.g. a range of values of 3-20 includes 3.0, 3.1, 3.2, 3.3, 3.4, 3.5, 3.6, 3.7, 3.8, 3.9, 4.0, and so on up to 20. Thus, as used herein, the term GO(m) describes all graphene oxide compositions having a C:O ratio of from 3 to about 20. For example, a GO with a C:O ratio of 6 is referred to as GO(6), and a GO with a C:O ratio of 8, is referred to as GO(8), and both fall within the definition of GO(m).

As used herein, "GO(L)" refers to low C:O ratio graphene oxides having a C:O ratio of approximately "L", wherein L is less than 3, e.g., in the range of from about 1, including 1, up to 3, and not including 3, e.g. about 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, or about 2.9. In many embodiments, a GO(L) material has a C:O ratio of approximately 2. The designations for the materials in the GO(L) group is the same as that of the GO(m) materials described above, e.g. "GO(2)" refers to graphene oxide with a C:O ratio of 2.

In some embodiments, the graphene oxide can be GO((m). In some embodiments, the graphene oxide can be GO(L). In some embodiments, the graphene oxide can be nanoporous.

Other Components

In some embodiments, the selective polymer matrix can further include a cross-linking agent. Cross-linking agents suitable for use in the selective polymer matrix can include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof. In some embodiments, the cross-linking agent can comprise formaldehyde, glutaraldehyde, or maleic anhydride. The selective polymer matrix can comprise any suitable amount of the cross-linking agent. For example, the selective polymer matrix can comprise 1 to 40 percent cross-linking agents by weight of the selective polymer matrix.

The selective polymer matrix can further include a base. The base can act as a catalyst to catalyze the cross-linking of the selective polymer matrix (e.g., cross-linking of a hydrophilic polymer with an amine-containing polymer). In some embodiments, the base can remain in the selective polymer matrix and constitute a part of the selective polymer matrix. Examples of suitable bases include potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In some embodiments, the base can include potassium hydroxide. The selective polymer matrix can comprise any suitable amount of the base. For example, the selective polymer matrix can comprise 1 to 40 percent base by weight of the selective polymer matrix.

The selective polymer layer further comprises carbon nanotubes dispersed within the selective polymer matrix. Any suitable carbon nanotubes (prepared by any suitable method or obtained from a commercial source) can be used. The carbon nanotubes can comprise single-walled carbon nanotubes, multiwalled carbon nanotubes, or a combination thereof.

In some cases, the carbon nanotubes can have an average diameter of a least 10 nm (e.g., at least 20 nm, at least 30 nm, or at least 40 nm). In some cases, the carbon nanotubes can have an average diameter of 50 nm or less (e.g., 40 nm or less, 30 nm or less, or 20 nm or less). In certain embodiments, the carbon nanotubes can have an average diameter ranging from any of the minimum values described above to any of the maximum values described above. For example, the carbon nanotubes can have an average diameter of from 10 nm to 50 nm (e.g., from 10 nm to 30 nm, or from 20 nm to 50 nm).

In some cases, the carbon nanotubes can have an average length of at least 50 nm (e.g., at least 100 nm, at least 200 nm, at least 300 nm, at least 400 nm, at least 500 nm, at least 600 nm, at least 700 nm, at least 800 nm, at least 900 nm, at least 1 μm, at least 5 μm, at least 10 μm, or at least 15 μm). In some cases, the carbon nanotubes can have an average length of 20 μm or less (e.g., 15 μm or less, 10 μm or less, 5 μm or less, 1 μm or less, 900 nm or less, 800 nm or less, 700 nm or less, 600 nm or less, 500 nm or less, 400 nm or less, 300 nm or less, 200 nm or less, or 100 nm or less).

In certain embodiments, the carbon nanotubes can have an average length ranging from any of the minimum values described above to any of the maximum values described above. For example, the carbon nanotubes can have an average length of from 50 nm to 20 μm (e.g., from 200 nm to 20 μm, or from 500 nm to 10 μm).

In some cases, the carbon nanotubes can comprise unfunctionalized carbon nanotubes. In other embodiments, the carbon nanotubes can comprise sidewall functionalized carbon nanotubes. Sidewall functionalized carbon nanotubes are well known in the art. Suitable sidewall functionalized carbon nanotubes can be prepared from unfunctionalized carbon nanotubes, for example, by creating defects on the sidewall by strong acid oxidation. The defects created by the oxidant can subsequently converted to more stable hydroxyl and carboxylic acid groups. The hydroxyl and carboxylic acid groups on the acid treated carbon nanotubes can then coupled to reagents containing other functional groups (e.g., amine-containing reagents), thereby introducing pendant functional groups (e.g., amino groups) on the sidewalls of the carbon nanotubes. In some embodiments, the carbon nanotubes can comprise hydroxy-functionalized carbon nanotubes, carboxy-functionalized carbon nanotubes, amine-functionalized carbon nanotubes, or a combination thereof.

In some embodiments, the selective polymer layer can comprise at least 0.5% (e.g., at least 1%, at least 1.5%, at least 2%, at least 2.5%, at least 3%, at least 3.5%, at least 4%, or at least 4.5%) by weight carbon nanotubes, based on the total dry weight of the selective polymer layer. In some embodiments, the selective polymer layer can comprise 5% or less (e.g., 4.5% or less, 4% or less, 3.5% or less, 3% or less, 2.5% or less, 2% or less, 1.5% or less, or 1% or less)

by weight carbon nanotubes, based on the total dry weight of the selective polymer layer.

The selective polymer layer can comprise an amount of carbon nanotubes ranging from any of the minimum values described above to any of the maximum values described above. For example, the selective polymer layer can comprise from 0.5% to 5% (e.g., from 1% to 3%) by weight carbon nanotubes, based on the total dry weight of the selective polymer layer.

If desired, the selective polymer layer can be surface modified by, for example, chemical grafting, blending, or coating to improve the performance of the selective polymer layer. For example, hydrophobic components may be added to the selective polymer layer to alter the properties of the selective polymer layer in a manner that facilitates greater fluid selectivity.

The total thickness of each layer in the membrane can be chosen such that the structure is mechanically robust, but not so thick as to impair permeability. In some embodiments, the selective polymer layer can have a thickness of from 50 nanometers to 5 microns (e.g., from 50 nm to 2 microns, or from 100 nanometers to 750 nanometers, or from 250 nanometers to 500 nanometers). In some embodiments, the support layer can have a thickness of from 1 micron to 500 microns (e.g., from 50 to 250 microns). In some cases, the membranes disclosed herein can have a thickness of from 5 microns to 500 microns.

Methods of Making

Methods of making these membranes are also disclosed herein. Methods of making membranes can include depositing a selective polymer layer on a support layer to form a selective layer disposed on the support layer. The selective polymer layer can comprise a selective polymer matrix and graphene oxide dispersed within the selective polymer matrix.

Optionally, the support layer can be pretreated prior to deposition of the selective polymer layer, for example, to remove water or other adsorbed species using methods appropriate to the support and the adsorbate. Examples of absorbed species are, for example, water, alcohols, porogens, and surfactant templates.

The selective polymer layer can be prepared by first forming a coating solution including the components of the selective polymer matrix (e.g., a hydrophilic polymer, an amino compound, a $CO_2$-philic ether, or a combination thereof; and optionally a cross-linking agent and a basic compound) and graphene oxide in a suitable solvent. One example of a suitable solvent is water. In some embodiments, the amount of water employed will be in the range of from 50% to 99%, by weight of the coating solution. The coating solution can then be used in forming the selective polymer layer. For example, the coating solution can be coated onto a support later (e.g., a nanoporous gas permeable membrane) using any suitable technique, and the solvent may be evaporated such that a nonporous membrane is formed on the substrate. Examples of suitable coating techniques include, but are not limited to, "knife coating" or "dip coating". Knife coating include a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. Dip coating include a process in which a polymer solution is contacted with a porous support. Excess solution is permitted to drain from the support, and the solvent of the polymer solution is evaporated at ambient or elevated temperatures.

The membranes disclosed can be shaped in the form of hollow fibers, tubes, films, sheets, etc. In certain embodiments, the membrane can be configured in a flat sheet, a spiral-wound, a hollow fiber, or a plate-and-frame configuration.

In some embodiments, membranes formed from a selective polymer matrix containing for example, a hydrophilic polymer, a cross-linking agent, a base, an amino compound, a $CO_2$-philic ether, and graphene oxide can be heated at a temperature and for a time sufficient for cross-linking to occur. In one example, cross-linking temperatures in the range from 80° C. to 100° C. can be employed. In another example, cross-linking can occur from 1 to 72 hours. The resulting solution can be coated onto the support layer and the solvent evaporated, as discussed above. In some embodiments, a higher degree of cross-linking for the selective polymer matrix after solvent removal takes place at about 100° C. to about 180° C., and the cross-linking occurs in from about 1 to about 72 hours.

An additive may be included in the selective polymer layer before forming the selective polymer layer to increase the water retention ability of the membrane. Suitable additives include, but are not limited to, polystyrenesulfonic acid-potassium salt, polystyrenesulfonic acid-sodium salt, polystyrenesulfonic acid-lithium salt, sulfonated polyphenyleneoxides, alum, and combinations thereof. In one example, the additive comprises polystyrenesulfonic acid-potassium salt.

In some embodiments, the method of making these membranes can be scaled to industrial levels.

Methods of Use

The membranes disclosed herein can be used for separating gaseous mixtures. For example, provided are methods for separating a first gas from a feed gas comprising the first gas and one or more additional gases (e.g., at least a second gas). The method can include contacting any of the disclosed membranes (e.g., on the side comprising the selective polymer) with the feed gas under conditions effective to afford transmembrane permeation of the first gas. In some embodiments, the method can also include withdrawing from the reverse side of the membrane a permeate containing at least the first gas, wherein the first gas is selectively removed from the gaseous stream. The permeate can comprise at least the first gas in an increased concentration relative to the feed stream. The term "permeate" refers to a portion of the feed stream which is withdrawn at the reverse or second side of the membrane, exclusive of other fluids such as a sweep gas or liquid which may be present at the second side of the membrane.

The membrane can be used to separate fluids at any suitable temperature, including temperatures of 100° C. or greater. For example, the membrane can be used at temperatures of from 100° C. to 180° C. In some embodiments, a vacuum can be applied to the permeate face of the membrane to remove the first gas. In some embodiments, a sweep gas can be flowed across the permeate face of the membrane to remove the first gas. Any suitable sweep gas can be used. Examples of suitable sweep gases include, for example, air, steam, nitrogen, argon, helium, and combinations thereof.

The first gas can include an acid gas. For example, the first gas can be carbon dioxide, hydrogen sulfide, hydrochloric acid, sulfur dioxide, sulfur trioxide, nitrogen oxide, or combinations thereof. In some embodiments, the membrane can be selective to carbon dioxide versus hydrogen, nitrogen, carbon monoxide, or combinations thereof. In some embodiments, the membrane can be selective to hydrogen sulfide versus hydrogen, nitrogen, carbon monoxide, or combinations thereof. In some embodiments, the membrane can be selective to hydrochloric acid gas versus hydrogen, nitrogen, carbon monoxide, or combinations thereof. In some embodiments, the acid gas may be derived from fossil fuels that require hydrogen purification for fuel cell, electricity generation, and hydrogenation applications, biogas for renewable energy, and natural gas for commercial uses. For example, the membranes may be employed in a fuel cell (e.g., to purify feed gases prior to entering the fuel cell). The membranes can also be used for removal of carbon dioxide from flue gas.

In certain embodiments, the feed gas comprises syngas. The first gas can comprise carbon dioxide and the second gas can comprise hydrogen. In these embodiments, the membranes described herein can be employed, for example, to decarbonize coal-derived syngas.

The permeance of the first gas or the acid gas can be at least 50 GPU (e.g., 75 GPU or greater, 100 GPU or greater, 150 GPU or greater, 200 GPU or greater, 250 GPU or greater, 300 GPU or greater, 350 GPU or greater, 400 GPU or greater, 450 GPU or greater, 500 GPU or greater, 550 GPU or greater, 600 GPU or greater, 650 GPU or greater, 700 GPU or greater, 750 GPU or greater, 800 GPU or greater, 850 GPU or greater, 900 GPU or greater, 950 GPU or greater, 1000 GPU or greater, 1100 GPU or greater, 1200 GPU or greater, 1300 GPU or greater, or 1400 GPU or greater) at 107° C. and 31.7 bar feed pressure.

The permeance of the first gas or the acid gas can be 1500 GPU or less at 107° C. and 31.7 bar feed pressure (e.g., 1400 GPU or less, 1300 GPU or less, 1200 GPU or less, 1100 GPU or less, 1000 GPU or less, 950 GPU or less, 900 GPU or less, 850 GPU or less, 800 GPU or less, 750 GPU or less, 700 GPU or less, 650 GPU or less, 600 GPU or less, 550 GPU or less, 500 GPU or less, 450 GPU or less, 400 GPU or less, 350 GPU or less, 300 GPU or less, 250 GPU or less, 200 GPU or less, 150 GPU or less, 100 GPU or less, or 75 GPU or less).

The permeance of the first gas or the acid gas through the membrane can vary from any of the minimum values described above to any of the maximum values described above. For example, the permeance of the first gas or the acid gas can be from 50 GPU to 1500 GPU at 107° C. and 31.7 bar feed pressure (e.g., from 300 GPU to 1500 GPU at 120° C., or from 500 GPU to 1500 GPU at 107° C. and 31.7 bar feed pressure).

The membrane can exhibit a first gas/second gas selectivity of at least 10 at 107° C. and 31 atm feed pressure. In some embodiments, the membrane can exhibit a first gas/second gas selectivity of up to 500 at 107° C. and 31.7 bar feed pressure. For example, the membrane can exhibit a first gas/second gas selectivity of 10 or greater, 25 or greater, 50 or greater, 75 or greater, 100 or greater, 125 or greater, 150 or greater, 175 or greater, 200 or greater, 225 or greater, 250 or greater, 275 or greater, 300 or greater, 325 or greater, 350 or greater, 375 or greater, 400 or greater, 425 or greater, 450 or greater, or 475 or greater at 107° C. and 31.7 bar feed pressure. In some embodiments, the permeance and selectivity of the membrane for the first gas or the acid gas can vary at higher or lower temperatures.

By way of non-limiting illustration, examples of certain embodiments of the present disclosure are given below.

EXAMPLES

Example 1. Membranes and Membrane Process for Hydrogen Purification from Coal-Derived Syngas In these examples, three membranes tailored for a single-stage membrane process to decarbonize coal-derived syngas are described. In these membranes, water-swellable cross-linked polyvinyl alcohol is used as polymer matrix, along with high MW polyvinylamine as fixed-site carrier. For Membrane I, an amino acid salt of 2-(1-piperazinyl)ethylamine and sarcosine is used as the mobile carrier; sarcosine has a mild degree of steric hindrance. In Membrane II, the 2-(1-piperazinyl)ethylamine salt of 2-aminoisobutyric acid (PZEA-MBA) is used as the mobile carrier; AIBA is a sterically hindered amine. Membranes III and IV utilized 1-(2-hydroxyethyl)piperazine and 1,4-bis(2-hydroxyethyl)piperazine as the mobile carriers, respectively, which contain multiple amino groups and $CO_2$-phile hydroxyl groups. In addition, poly(ethylene glycol) dimethyl ether is incorporated in Membranes III and IV as a $CO_2$-phile moiety. Nanoporous graphene oxide is dispersed in all three membranes to avoid membrane compaction upon high feed pressure.

The membranes were tested at 107° C. and 31.7 bar feed pressure with a $CO_2$ partial pressure of 12.5 to 0.5 bar, which corresponded to the feed $CO_2$ partial pressures before and after the bulk $CO_2$ removal, respectively. The separation performances of Membranes I and II depended strongly on the $CO_2$ partial pressure, yielding a $CO_2$ permeance of 72-435 GPU (1 GPU=$10^{-6}$ $cm^3(STP) \cdot cm^{-2} \cdot s^{-1} \cdot cmHg^{-1}$) with a $CO_2/H_2$ selectivity of 93-558. The $CO_2$ permeance reduced significantly with increasing $CO_2$ partial pressure due to the carrier saturation phenomenon. On the other hand, the presence of amino groups and the abundant $CO_2$-philic moieties in Membranes III and IV enhanced the $CO_2$ solubility at high $CO_2$ partial pressure, thereby a $CO_2$ permeance of 206-246 GPU and a decent $CO_2/H_2$ selectivity of 103-123 were obtained for a $CO_2$ partial pressure of 12.5-3.5 bar. The different degrees of dependence on the feed $CO_2$ partial pressure provide a design opportunity for a single-stage membrane process. The more permeable but less selective Membrane III can be implemented to the proximity of feed inlet, where the $CO_2$ partial pressure is high but the $H_2$ partial pressure is low. Upon $CO_2$ removal, the feed $CO_2$ partial pressure sharply reduces whereas the $H_2$ transmembrane driving force increases. In this case, Membrane I or II can be used to elevate the $CO_2$ permeance and $CO_2/H_2$ selectivity. The membrane process design shows that the single-stage membrane process can achieve 90% $CO_2$ removal with >99% $H_2$ recovery.

Materials and Methods 2-(1-piperazinyl)ethylamine (PZEA, 99%), sarcosine (Sar, 98%), 2-aminoisobutyric acid (AIBA, 98%), 1-(2-hydroxyethyl)piperazine (HEP, 98%), 1,4-bis(2-hydroxyethyl)piperazine (DHEP, 98%), poly(ethylene glycol) dimethyl ether (PEGDME, Mn ~250), potassium hydroxide (KOH, 85%), and glutaraldehyde solution (50 wt. %) were purchased from Sigma-Aldrich (Milwaukee, WI). Polyvinylalcohol (Poval S-2217, 92%) was given by Kuraray America Inc. (Houston, TX). All the chemicals were used as received without further purification. Monolayer graphene oxide (GO) was purchased from TCI America (Portland, OR, USA) in the form of solid flakes, which requires ultrasonication before use for membrane preparation. For gas permeation measurements, pre-purified $CO_2$ and argon were purchased from Praxair Inc. (Danbury, CT).

The amine-containing polymer need not be limited to polyvinylamine (PVAm). A variety of amine-containing polymers can be used, such as polyallylamine, polyethyleneimine, copolymers, and blends thereof. The amine-containing polymer employed in these examples is PVAm purified from a commercial product named Polyminx VX from BASF (Vandalia, IL). The PVAm has a high weight average molecular weight of 2,000 kDa. The amine-containing polymer can have a weight average molecular weight of from 300 to 3,000 kDa; however, in certain embodiments, the amine-containing polymer can have a weight average molecular weight of at least 1000 kDa.

Preparation of Nanoporous Graphine Oxide (GO)

GO was dispersed in water (~1 mg/ml) by an ultrasonication probe with a power of 2500 W for 3 hr. KOH solution (50 wt. %) was added slowly into the GO dispersion with a KOH-to-GO weight ratio of 14:1 to prevent the precipitation of GO. The mixture was further ultrasonicated for 30 min. After this, the water was evaporated in a convection oven at 60° C., followed by a further drying in a vacuum oven at 60° C. overnight. The resultant solid was annealed at 200° C. for 2 hr to create pores on the GO basal plane. After the thermal treatment, the solid was washed by DI water under vacuum filtration until the filtrate reached a pH of 7. The purified nanoporous GO (nGO) was dispersed in water again (~1 mg/ml) by an ultrasonication bath.

Coating Solution and Membrane Preparation

The nGO-reinforced composite membranes were synthesized by the following steps.

First, PVA was dissolved in DI water at 80° C. under stirring. A stoichiometric amount of glutaraldehyde and a certain amount of KOH were added into the PVA aqueous solution to achieve a 100 mol % degree of crosslinking, based on the hydroxyl groups of PVA. The PVA/glutaraldehyde/KOH solution was heated at 80° C. for 3 h under stirring.

Certain amount of the purified PVAm solution was added in the crosslinked PVA solution under vigorous agitation. The nGO dispersion with a concentration of ~1 mg/ml was added dropwise to the polymer solution by a 10-μL glass capillary tube under vigorous agitation, aiming for 3 wt. % nGO loading in the final total solid of the coating solution. The mixture was transferred to a 15-mL conical centrifuge tube, in which it was homogenized by the ⅛" Microtip sonication probe with a 50% amplitude until uniformly dispersed. The sonication was carried out in an ice bath. The water introduced by the nGO dispersion was vaporized by a nitrogen purge.

The aminoacid salt mobile carriers were synthesized by reacting the base, PZEA, with a aminoacid, Sar or AIBA. The stoichiometric amount of Sar or AIBA was added in a 24 wt. % PZEA aqueous solution under vigorous mixing. The solution was mixed at room temperature for 2 h before use. The chemical structures of PZEA-Sar and PZEA-AIBA are shown in FIG. 1.

Certain amount of the mobile carrier solutions, including the aminoacid and the $CO_2$-philic moieties, were incorporated in the dispersion to form the coating solution. After centrifugation at 8,000×g for 3 min to remove any air bubbles, the coating solution was coated on a nanoporous polysulfone (PSf) substrate by a using GARDCO adjustable micrometer film applicator (Paul N. Gardner Company, Pompano Beach, FL) with a controlled gap setting. The membrane was dried in a fume hood at room temperature for 30 min, then cured at 120° C. for 6 h.

Gas Permeation Measurements

The transport properties of the composite membrane were measured by a Wicke-Kallenbach permeation apparatus [2]. The membranes were tested at 107° C. and 31.7 bar feed pressure with a simulated syngas containing 4% water and 6000 ppm $H_2S$ with balance of $CO_2$ and $H_2$. The $CO_2$ and $H_2$ concentrations were varied gradually to reduce the feed side $CO_2$ partial pressure from 12.5 to 0.5 bar, which corresponded to the feed $CO_2$ partial pressures before and after the bulk $CO_2$ removal, respectively. The permeate pressure was maintained at 1 psig. After leaving the gas permeation cell, the water vapors in both the retentate and the permeate were trapped in respective water knockout vessels. The dry gas compositions of both gas streams were analyzed using a gas chromatograph that was equipped with a thermal conductivity detector (Model 6890 N, Agilent Technologies, Palo Alto, CA) and a stainless steel micropacked column (80/100 mesh Carboxen 1004, Sigma-Aldrich, St. Louis, MO).

Example Membrane I

In this example, PZEA-Sar was used as the mobile carrier to facilitate $CO_2$ transport in a polymer matrix formed by crosslinked PVA and PVAm.

3 g PVAm aqueous solution (4 wt. %) was added in 1 g of crosslinked PVA aqueous solution (8 wt. % crosslinked PVA, 4.4 wt. % KOH) dropwise under vigorous agitation. Then, 8 g of nGO dispersion (~0.1 wt %) was added in the polymer solution dropwise under vigorous mixing. After this, the mixture was sonicated to re-disperse. Afterwards, the water introduced by the nGO dispersion was evaporated by N2. Finally, 0.222 g PZEA-Sar aqueous solution (43.19 wt. %) was added in the dispersion to form a homogeneous coating solution. A centrifugation at 8,000×g for 3 min was conducted to remove any air bubbles entrapped in the coating solution. The coating solution was coated on a nanoporous polysulfone (PSf) substrate by using a GARDCO adjustable micrometer film applicator, resulting in a selective layer thickness of about 25 μm. The membrane was dried in a fume hood at room temperature for 30 min and then cured at 120° C. for 6 h.

Figure 2:
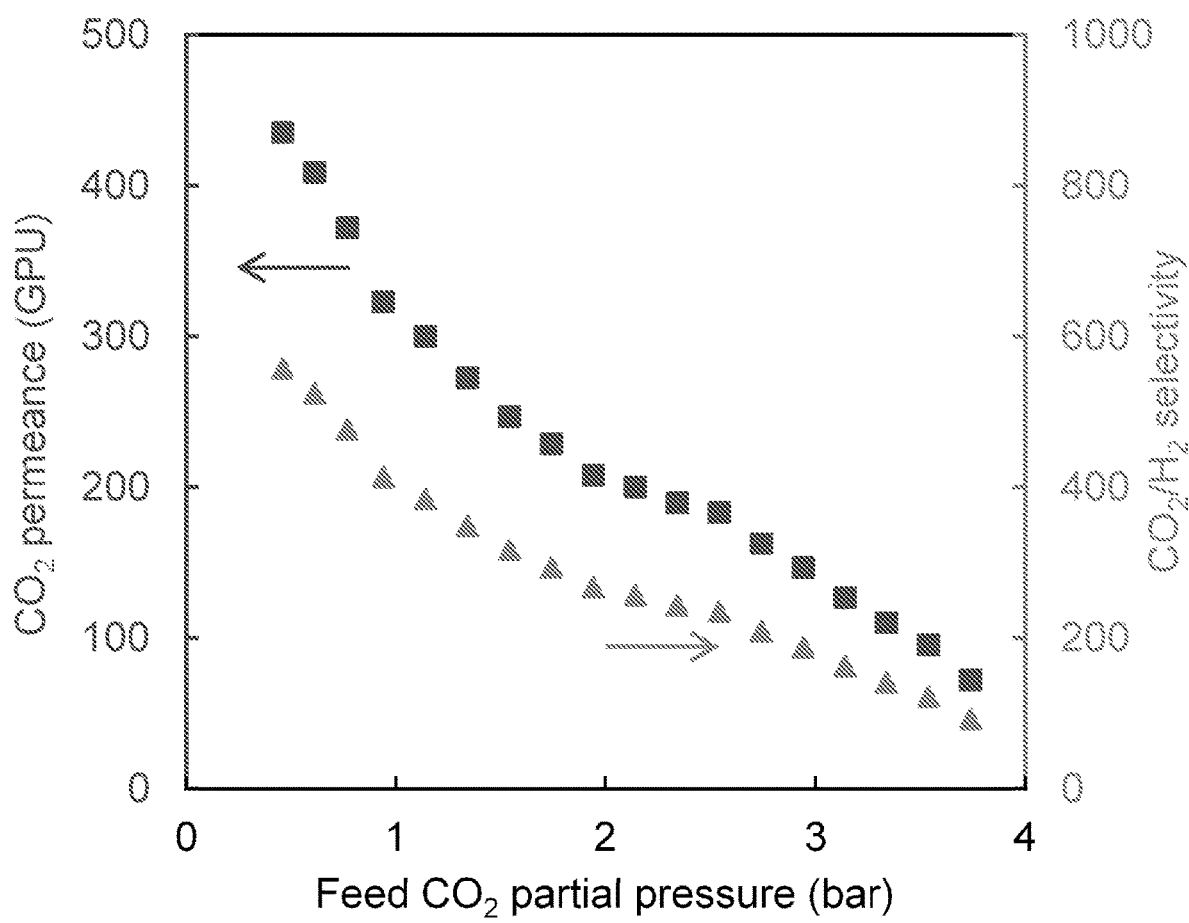
FIG. 2 is a plot showing the $CO_2$ permeance and $CO_2$/$H_2$ selectivity of Membrane I at various feed $CO_2$ partial pressures in simulated syngas.

FIG. 2 shows the $CO_2$ permeance and $CO_2/H_2$ selectivity as a function of feed $CO_2$ partial pressure for this membrane with a simulated syngas at 107° C. and 31.7 bar. The simulated syngas comprised 4% water vapor and 6000 ppm $H_2S$ with balance of $CO_2$ and $H_2$. The $CO_2$ and $H_2$ concentrations were varied gradually to reduce the feed side $CO_2$ partial pressure from 12.5 to 0.5 bar, which corresponded to the feed $CO_2$ partial pressures before and after the bulk $CO_2$ removal, respectively. As seen in FIG. 2, this membrane showed the highest $CO_2$ permeance of 435 GPU (1 GPU=$10^{-6}$ $cm^3(STP) \cdot cm^{-2} \cdot s^{-1} \cdot cmHg^{-1}$) at 0.5 bar of feed $CO_2$ partial pressure, and the $CO_2$ permeance reduced significantly with increasing $CO_2$ partial pressure due to the carrier saturation phenomenon. At the carrier saturation phenomenon, the lower performance was caused by less free amine carriers available in the membrane at higher $CO_2$ partial pressure. $H_2$, on the other hand, permeated through the membrane via the solution-diffusion mechanism, and its permeance remained as constant at 0.78 GPU. Consequently, the $CO_2/H_2$ selectivity also reduced from 558 to 93.

Example Membrane II

In this example, PZEA-MBA was used as the mobile carrier to facilitate $CO_2$ transport in a polymer matrix formed by crosslinked PVA and PVAm.

0.5 g PVAm aqueous solution (4 wt. %) was added in 1 g of crosslinked PVA aqueous solution (8 wt. % crosslinked PVA, 4.4 wt. % KOH) dropwise under vigorous agitation. Then, 8 g of nGO dispersion (~0.1 wt %) was added in the polymer solution dropwise under vigorous mixing. After this, the mixture was sonicated to re-disperse. Afterwards, the water introduced by the nGO dispersion was evaporated by N2. Finally, 0.988 g PZEA-AIBA aqueous solution (27.13 wt. %) was added in the dispersion to form a homogeneous coating solution. A centrifugation at 8,000×g for 3 min was conducted to remove any air bubbles entrapped in the coating solution. The coating solution was coated on a nanoporous polysulfone (PSf) substrate by using a GARDCO adjustable micrometer film applicator, resulting in a selective layer thickness of about 25 μm. The membrane was dried in a fume hood at room temperature for 30 min and then cured at 120° C. for 6 h.

Figure 3:
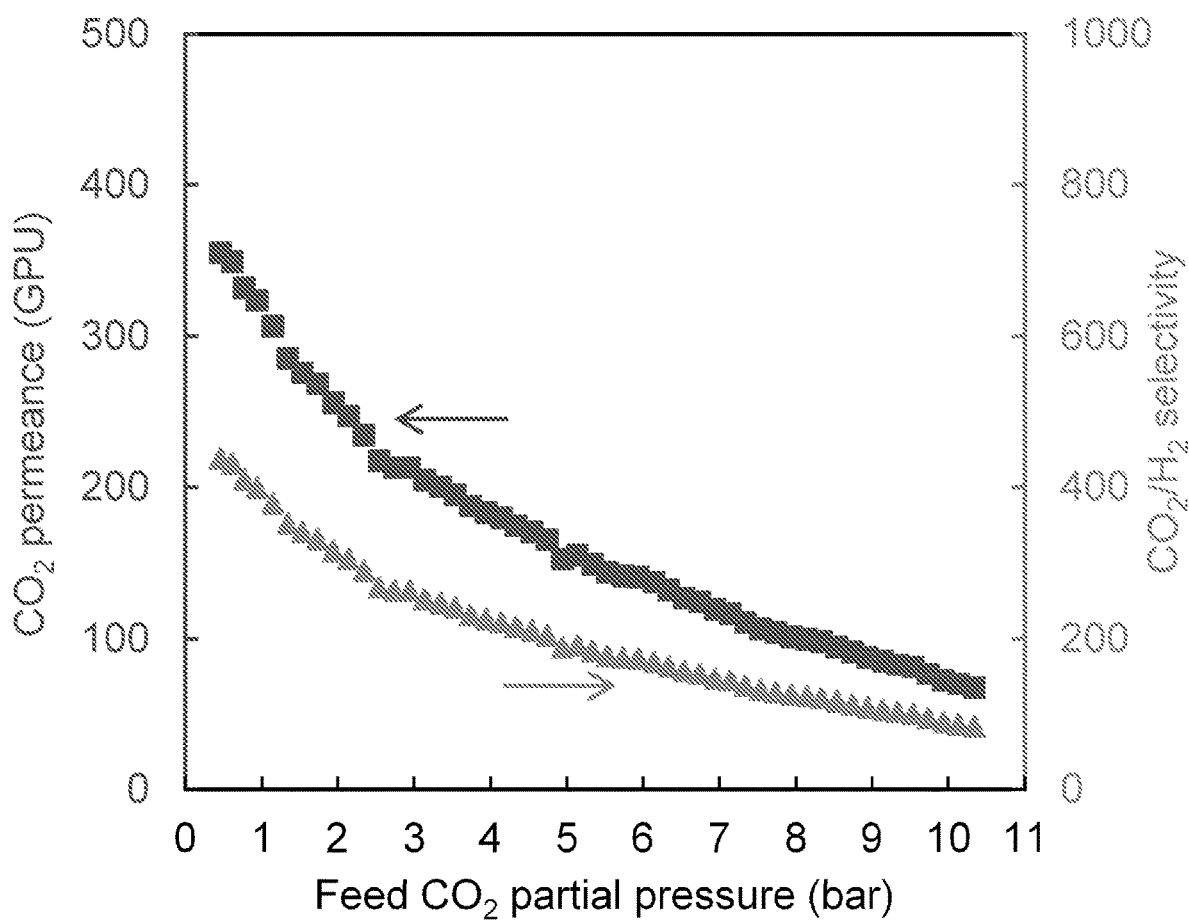
FIG. 3 is a plot showing the $CO_2$ permeance and $CO_2$/$H_2$ selectivity of Membrane II at various feed $CO_2$ partial pressures in simulated syngas.

FIG. 3 shows the $CO_2$ permeance and $CO_2/H_2$ selectivity as a function of feed $CO_2$ partial pressure for this membrane with a simulated syngas at 107° C. and 31.7 bar. The simulated syngas comprised 4% water vapor and 6000 ppm $H_2S$ with balance of $CO_2$ and $H_2$. The $CO_2$ and $H_2$ concentrations were varied gradually to reduce the feed side $CO_2$ partial pressure from 12.5 to 0.5 bar, which corresponded to the feed $CO_2$ partial pressures before and after the bulk $CO_2$ removal, respectively. A similar dependence on the feed $CO_2$ partial pressure was observed for Membrane II. However, the sterically hindered AMA in Membrane II mitigated the carrier saturation phenomenon. A considerable $CO_2$ permeance of 117-307 GPU and a high $CO_2/H_2$ selectivity of 144-379 were obtained for a $CO_2$ partial pressure of 1-7 bar.

Example Membrane III

In this example, HEP was used as the mobile carrier to facilitate $CO_2$ transport in a polymer matrix formed by crosslinked PVA and PVAm. In addition, PEGDME was also incorporated as a $CO_2$-philic moiety to enhance the $CO_2$ solubility at high $CO_2$ partial pressure.

0.2 g PVAm aqueous solution (4 wt. %) was added in 1 g of crosslinked PVA aqueous solution (8 wt. % crosslinked PVA, 4.4 wt. % KOH) dropwise under vigorous agitation. Then, 8 g of nGO dispersion (~0.1 wt %) was added in the polymer solution dropwise under vigorous mixing. After this, the mixture was sonicated to re-disperse. Afterwards, the water introduced by the nGO dispersion was evaporated by N2. Finally, 0.14 g HEP and 0.14 g PEGDME were added in the dispersion, respectively, to form a homogeneous coating solution. A centrifugation at 8,000×g for 3 min was conducted to remove any air bubbles entrapped in the coating solution. The coating solution was coated on a nanoporous polysulfone (PSf) substrate by using a GARDCO adjustable micrometer film applicator, resulting in a selective layer thickness of 15 μm. The membrane was dried in a fume hood at room temperature for 30 min and then cured at 120° C. for 6 h.

Figure 4:
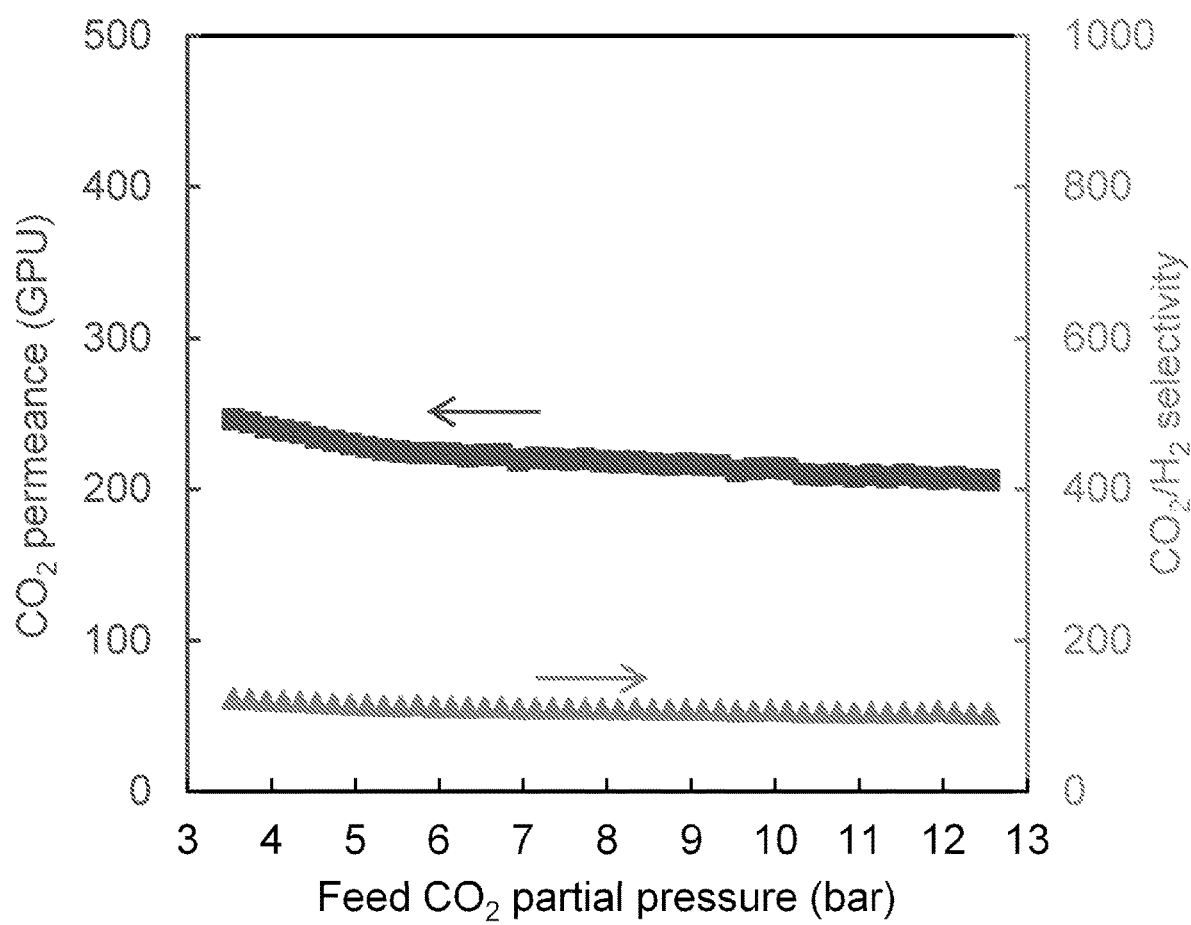
FIG. 4 is a plot showing the $CO_2$ permeance and $CO_2$/$H_2$ selectivity of Membrane III at various feed $CO_2$ partial pressures in simulated syngas.

FIG. 4 shows the $CO_2$ permeance and $CO_2/H_2$ selectivity as a function of feed $CO_2$ partial pressure for this membrane with a simulated syngas at 107° C. and 31.7 bar. The simulated syngas comprised 4% water vapor and 6000 ppm $H_2S$ with balance of $CO_2$ and $H_2$. The $CO_2$ and $H_2$ concentrations were varied gradually to reduce the feed side $CO_2$ partial pressure from 12.5 to 0.5 bar, which corresponded to the feed $CO_2$ partial pressures before and after the bulk $CO_2$ removal, respectively. For this membrane, the feed $CO_2$ partial pressure had a very weak effect on the separation performance. The presence of amino groups and the abundant $CO_2$-phile moieties enhanced the $CO_2$ solubility in the membrane at high $CO_2$ partial pressure. Consequently, a $CO_2$ permeance of 206-246 GPU and a very good $CO_2/H_2$ selectivity of 103-123 were obtained for a $CO_2$ partial pressure of 3.5-12.5 bar.

Example Membrane IV

In this example, DHEP was used as the mobile carrier to facilitate $CO_2$ transport in a polymer matrix formed by crosslinked PVA and PVAm. In addition, PEGDME was also incorporated as a $CO_2$-philic moiety to enhance the $CO_2$ solubility at high $CO_2$ partial pressure.

0.2 g PVAm aqueous solution (4 wt. %) was added in 1 g of crosslinked PVA aqueous solution (8 wt. % crosslinked PVA, 4.4 wt. % KOH) dropwise under vigorous agitation. Then, 8 g of nGO dispersion (~0.1 wt %) was added in the polymer solution dropwise under vigorous mixing. After this, the mixture was sonicated to re-disperse. Afterwards, the water introduced by the nGO dispersion was evaporated by N2. Finally, 0.14 g DHEP and 0.14 g PEGDME were added in the dispersion, respectively, to form a homogeneous coating solution. A centrifugation at 8,000×g for 3 min was conducted to remove any air bubbles entrapped in the coating solution. The coating solution was coated on a nanoporous polysulfone (PSf) substrate by a GARDCO adjustable micrometer film applicator, resulting in a selective layer thickness of 15 μm. The membrane was dried in a fume hood at room temperature for 30 min, then cured at 120° C. for 6 h.

Figure 5:
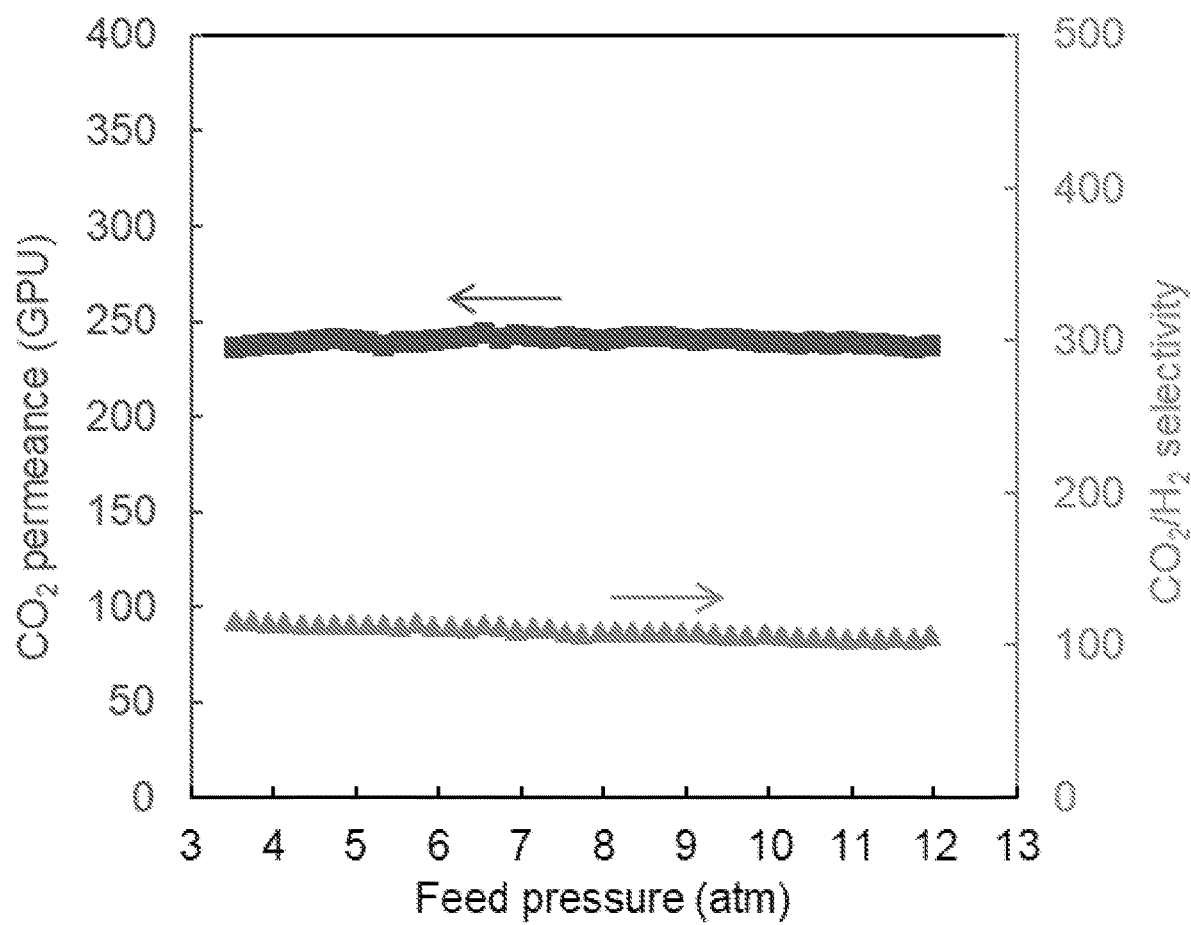
FIG. 5 is a plot showing the $CO_2$ permeance and $CO_2$/$H_2$ selectivity of Membrane IV at various feed $CO_2$ partial pressures in simulated syngas.

FIG. 5 shows the $CO_2$ permeances and $CO_2/H_2$ for this membrane with a simulated syngas at 107° C. and 31.7 bar. The simulated syngas comprised 4% water vapor and 6000 ppm $H_2S$ with balance of $CO_2$ and $H_2$. The $CO_2$ and $H_2$ concentrations were varied gradually to reduce the feed side $CO_2$ partial pressure from 12.5 to 0.5 bar, which corresponded to the feed $CO_2$ partial pressures before and after the bulk $CO_2$ removal, respectively. As seen, a $CO_2$ permeance of 235-242 GPU and a moderate $CO_2/H_2$ selectivity of 100-116 were obtained for a $CO_2$ partial pressure of 3.5-12.5 bar. Surprisingly, the membrane performance did not change much with $CO_2$ partial pressure. Compared to the Membrane III with HEP as the mobile carrier, this membrane showed ca. 20 GPU increase in $CO_2$ permeance, but not much improvement on $CO_2/H_2$ selectivity. This composition suggests a possibility to further optimize the carrier structure so that the carrier saturation behavior can be leveraged.

$H_2S/CO_2$ Separation Performance of Membranes II and III

Figure 6:
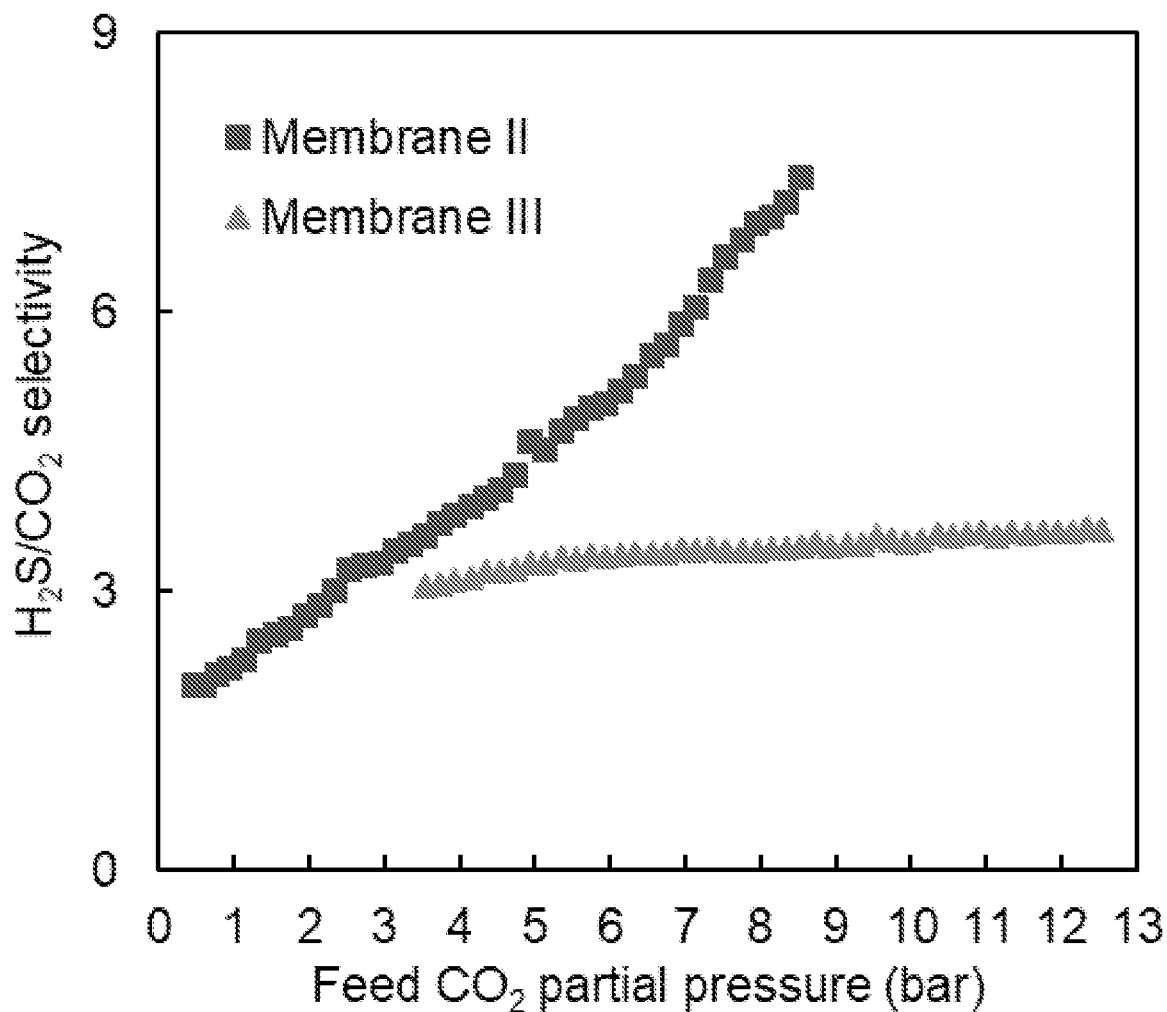
FIG. 6 is a plot showing the $H_2S$/$CO_2$ selectivity of Membranes II and III at various feed $CO_2$ partial pressures in simulated syngas.

The $H_2S/CO_2$ separation performances of Membranes II and III were also characterized, and the results are shown in FIG. 6. The $CO_2$ partial pressure barely affected $H_{2S}$ permeation. $H_{2S}$ permeances of 865 and 755 GPU were obtained for Membranes II and III, respectively. This led to a $H_2S/CO_2$ selectivity in the range of 3-7 for these membranes at 31.7 bar.

Membrane Carbon Capture Process from Coal-Derived Syngas

Figure 7:
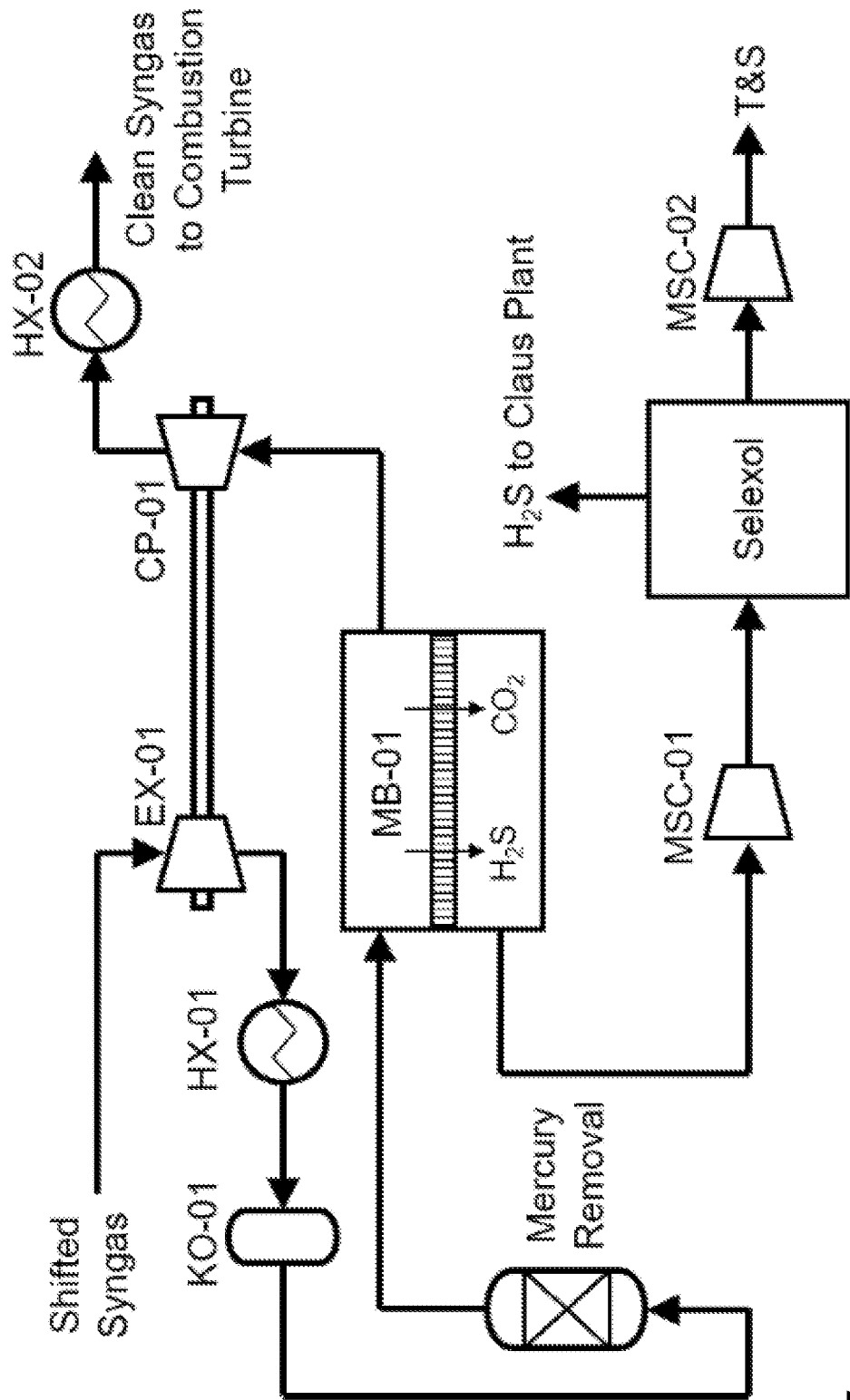
FIG. 7 is a schematic illustration of a proposed process employing the membranes described herein.

A detailed process flow diagram of the single stage membrane process is shown in FIG. 7. Cases B5A and B5B in the DOE 2015 Cost and Performance Baseline are followed to model the IGCC with General Electric Energy (GEE) "radiant-only" gasifier. The high pressure shifted syngas (54.1 bar) from the low temperature water-gas-shift reactor is expanded to about 18-31.7 bar by a turboexpander EX-01. The thermal expansion cools the gas stream for mercury removal by an activated, sulfur-impregnated carbon adsorption bed. For certain pressure range, a heat exchanger HX-01 and a water knockout drum KO-01 are used to adjust the syngas temperature to about 110° C. Then, the gas stream enters a single membrane stage with a $CO_2/H_2$ selectivity >100, which separates the feed to a $CO_2$-depleted retentate with 90% $CO_2$ removal and >99% $H_2$ recovery, and a $CO_2$-rich permeate with >95% $CO_2$ purity on dry basis. Due to an even higher $H_2S/H_2$ selectivity (>300), $H_2S$ also permeates to the downstream preferentially, resulting in <30 ppm $H_2S$ in the retentate. It should be noted that the drastically reducing $CO_2$ partial pressure from the feed to the retentate typically leads to an increasing $CO_2/H_2$ selectivity, e.g., >300, for the facilitated transport membrane. This feature is beneficial for achieving the high $H_2$ recovery. The retentate is recompressed to 31.7 bar by a coaxial compressor CP-01 driven by the turboexpander EX-01, if the discharge pressure of EX-01 is below 31.7 bar. This step is energy efficient since the $CO_2$ removal reduces the gas flow rate, thus a less energy consumption of the compressor. The remaining power generated by EX-01 is used for electricity generation. After recompression, the cleaned syngas rises to 196° C. and is sent to the gas turbine combustor for power generation. A heat exchanger HX-02 is optional for temperature adjustment. The permeate stream is operated at 1.1 bar to maximize the transmembrane driving force without incurring extra parasitic energy. This stream is then compressed to 50 bar by a 5-stage front-loaded centrifugal compressor MSC-01 and sent to a single-stage Selexol unit for $H_2S$ removal. The recovered $H_2S$ is further converted to elemental sulfur by a Claus plant. The $H_2S$-stripped $CO_2$ stream is eventually compressed to 153 bar by a 3-stage front-loaded centrifugal compressor MSC-02 for sequestration or enhanced oil recovery.

Figure 8:
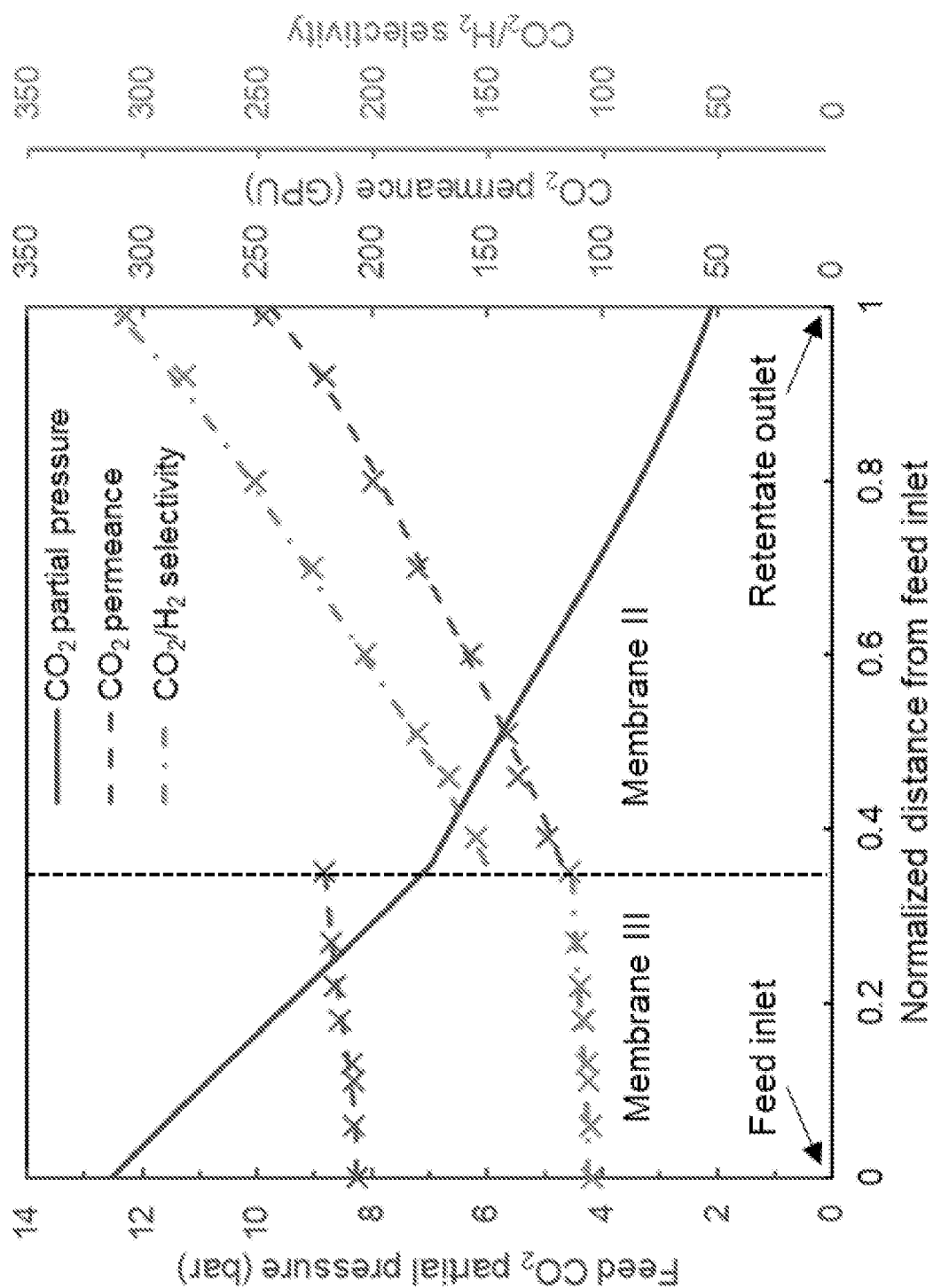
FIG. 8 is a plot showing the change of $CO_2$ partial pressure on the feed side of membrane module. Markers are the data shown in FIGS. 3 and 4.

FIG. 8 shows the change of $CO_2$ partial pressure on the feed side of the membrane module. A feed pressure of 31.7 bar and a permeate pressure of 1.1 bar are used to calculate the membrane area required for 90% $CO_2$ removal from the shifted gas. The horizontal axis in FIG. 8 is the distance from the feed inlet normalized by the total length of the feed flow path (~14 m for 550 MW). As seen, the $CO_2$ partial pressure reduces significantly due to the $CO_2$ removal, by which more carriers in the membrane can be available to facilitate the permeation of $CO_2$. To utilize this feature, the more permeable but less selective Membrane III is used in the proximity of the feed inlet, i.e., the first 35% of the membrane stage, whereas the more selective amine-containing Membrane II is used in the proximity of the retentate outlet, i.e., the remaining 65% of the membrane stage. This can be achieved by connecting the central tubes of spiral-wound modules made from the two different membranes, from an engineering point of view. As seen, the $CO_2$ permeance increases from about 206 GPU to 244 GPU from the feed inlet to the retentate outlet, based on the membrane performance obtained using the simulated syngas in FIGS. 3 and 4. Since $H_2$ only permeates through the membrane by the solution-diffusion mechanism, its permeance is about 1.95 GPU for Membrane III and 0.78 for Membrane II, which is not affected by the $CO_2$ partial pressure. Consequently, the $CO_2/H_2$ selectivity also increases from about 106 to 313 from the feed to the retentate. The drastically increased $CO_2$ permeance leads to a 30% reduction of the required membrane area compared to the one with constant permeance corresponding to the feed inlet. More importantly, the $H_2$ partial pressure increases significantly upon the $CO_2$ removal. The tripled $CO_2/H_2$ selectivity approaching to the retentate outlet minimizes the $H_2$ loss, and a $H_2$ recovery >99% can be achieved by a single membrane stage.

Figure 9:
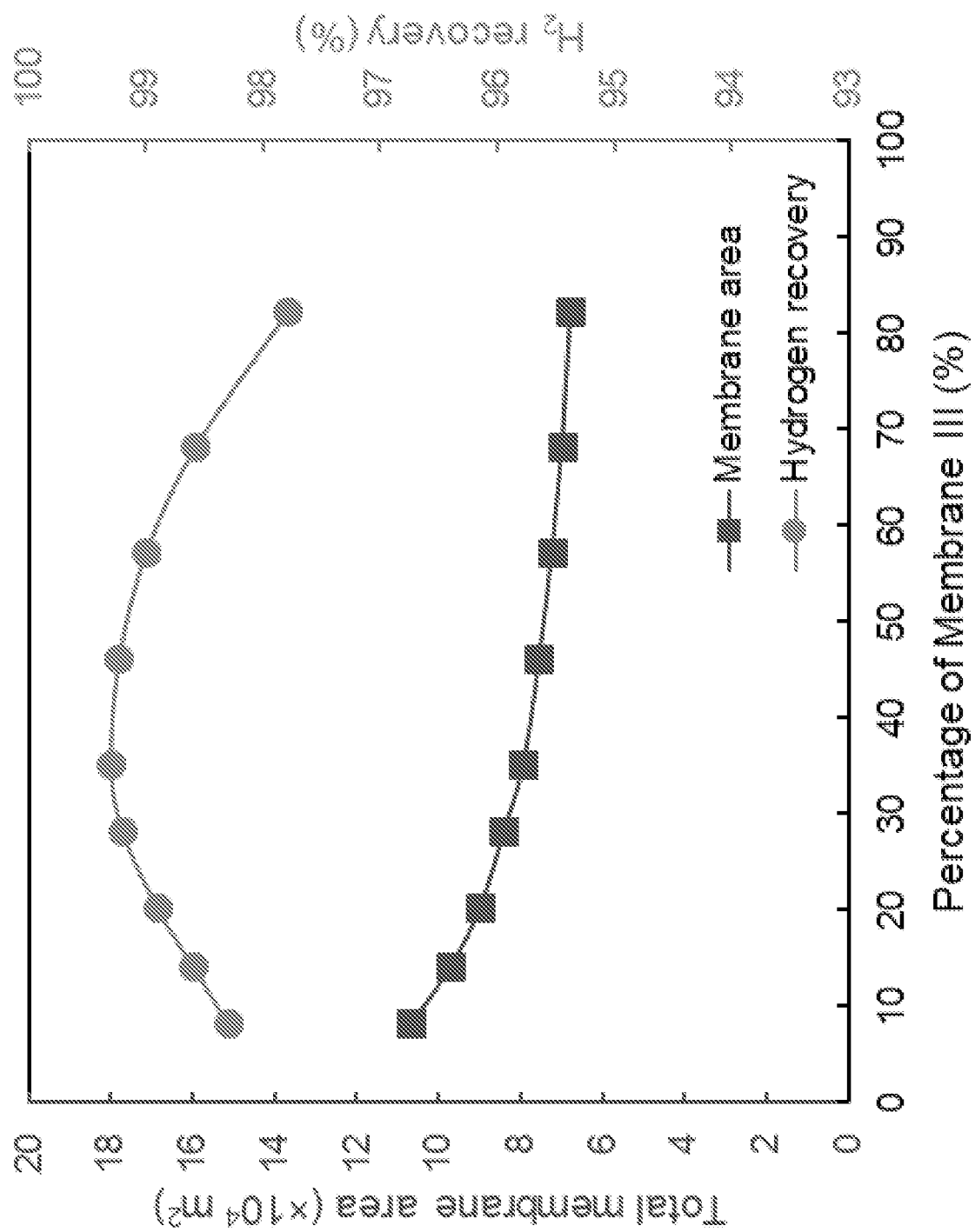
FIG. 9 is a plot showing the effect of membrane allocation on membrane area and $H_2$ recovery.

FIG. 9 shows how the allocation of Membranes II and III affects the total membrane area and $H_2$ recovery for a feed pressure of 31.7 bar, a permeate pressure of 1.1 bar with the experimentally measured transport data shown in FIGS. 3 and 4. The horizontal axis is the percentage of membrane area starting from the feed inlet where Membrane III is used. As shown, the membrane area reduces with increasing usage of Membrane III, due to its higher $CO_2$ permeance than that of Membrane II near the feed inlet. The effect on $H_2$ recovery is more complicated. When the usage of Membrane III is too high, the lack of highly $CO_2$-selective Membrane II near the retentate outlet results in a low $H_2$ recovery. On the other hand, if the usage of Membrane III is too low, the insufficient $CO_2/H_2$ selectivity of Membrane II near the feed inlet also deteriorates the $H_2$ recovery. This trade-off leads to an optimal $H_2$ recovery of 99.3% with a combination of 35% Membrane III and 65% of Membrane II.

REFERENCES

[1] K. Ramasubramanian, Y. Zhao, W. S. W. Ho, $CO_2$ capture and $H_2$ purification: Prospects for $CO_2$-selective membrane processes, AIChE J. 59 (2013) 1033-1045.
[2] R. Xing, W. S. W. Ho, Crosslinked polyvinylalcohol-polysiloxane/fumed silica mixed matrix membranes containing amines for $CO_2/H_2$ separation, J. Membr. Sci. 367 (2011) 91-102.
[3] T. Fout, A. Zoelle, D. Keairns, M. Turner, M. Woods, N. Kuehn, V. Shah, V. Chou, and L. Pinkerton, "Cost and Performance Baseline for Fossil Energy Plants Volume b: Bituminous Coal (IGCC) to Electricity Revision 2b—Year Dollar Update", National Energy Technology Laboratory Report, DOE/NETL-2015/1727 (2015).
[4] Z. Qiao, Z. Wang, S. Yuan, J. Wang, S. Wang, Preparation and characterization of small molecular amine modified PVAm membranes for $CO_2/H_2$ separation, J. Membr. Sci. 475 (2015) 290-302.
[5] Y. Zhao, B. T. Jung, L. Ansaloni, W. S. W. Ho, Multi-walled carbon nanotube mixed matrix membranes containing amines for high pressure $CO_2/H_2$ separation, J. Membr. Sci. 459 (2014) 233-243.
[6] L. Ansaloni, Y. Zhao, B. T. Jung, K. Ramasubramanian, M. G. Baschetti, W. S. W. Ho, Facilitated transport membranes containing amino-functionalized multi-walled carbon nanotubes for high-pressure $CO_2$ separations, J. Membr. Sci. 490 (2015) 18-28.

The compositions, systems, and methods of the appended claims are not limited in scope by the specific compositions, systems, and methods described herein, which are intended as illustrations of a few aspects of the claims. Any compositions, systems, and methods that are functionally equivalent are intended to fall within the scope of the claims. Various modifications of the compositions, systems, and methods in addition to those shown and described herein are intended to fall within the scope of the appended claims. Further, while only certain representative compositions, systems, and method steps disclosed herein are specifically described, other combinations of the compositions, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A membrane comprising:
   a support layer; and
   a selective polymer layer disposed on the support layer, the selective polymer layer comprising a selective polymer matrix and graphene oxide dispersed within the selective polymer matrix wherein the selective polymer matrix comprises a hydrophilic polymer, amine-containing polymer, a $CO_2$-philic ether, and a low molecular weight amino compound; and
   wherein the low molecular weight amino compound has a molecular weight of less than 1,000 Da.

2. The membrane of claim 1, wherein the amine-containing polymer is selected from the group consisting of polyvinylamine, polyallylamine, polyethyleneimine, poly-N-isopropylallylamine, poly-N-tert-butylallylamine, poly-N-1,2-dimethylpropylallylamine, poly-N-methylallylamine, poly-N,N-dimethylallylamine, poly-2-vinylpiperidine, poly-4-vinylpiperidine, polyaminostyrene, chitosan, copolymers, and blends thereof.

3. The membrane of claim 1, wherein the low molecular weight amino compound comprises a salt of a primary amine or a salt of a secondary amine.

4. The membrane of claim 1, wherein the low molecular weight amino compound comprises a salt defined by a general formula below

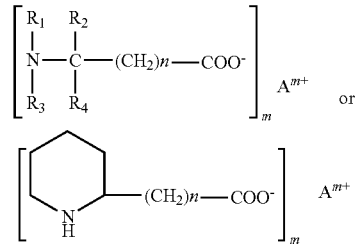

wherein $R_1$, $R_2$, $R_3$, and $R_4$ are hydrogen or hydrocarbon groups having from 1 to 4 carbon atoms, n is an integer ranging from 0 to 4, and $A^{m+}$ is a cation having a valence of 1 to 3, and m is an integer equal to the valence of the cation.

5. The membrane of claim 1, wherein the low molecular weight amino compound comprises a salt selected from the group consisting of aminoisobutyric acid-potassium salt, aminoisobutyric acid-lithium salt, aminoisobutyric acid-piperazine salt, glycine-potassium salt, glycine-lithium salt, glycine-piperazine salt, dimethylglycine-potassium salt, dimethylglycine-lithium salt, dimethylglycine-piperazine salt, piperadine-2-carboxlic acid-potassium salt, piperadine-2-carboxlic acid-lithium salt, piperadine-2-carboxlic acid-piperazine salt, piperadine-4-carboxlic acid-potassium salt, piperadine-4-carboxlic acid-lithium salt, piperadine-4-carboxlic acid-piperazine salt, piperadine-3-carboxlic acid-potassium salt, piperadine-3-carboxlic acid-lithium salt, piperadine-3-carboxlic acid-piperazine salt, and blends thereof.

6. The membrane of claim 1, wherein the low molecular weight amino compound comprises an amino acid salt.

7. The membrane of claim 6, wherein the amino acid salt is defined by the formula below

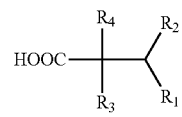

wherein, independently for each occurrence in the amino acid, each of $R_1$, $R_2$, $R_3$, and $R_4$ is selected from one of the following

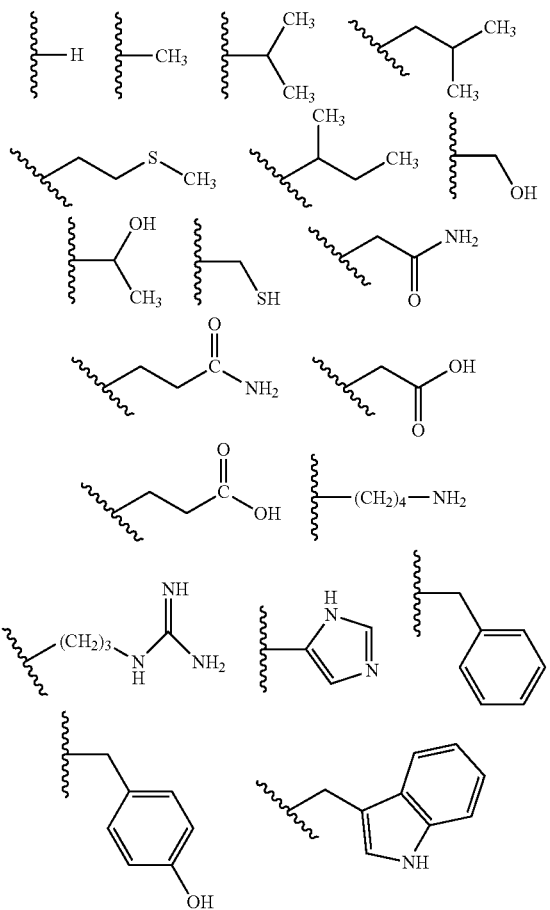

or $R_1$ and $R_3$, together with the atoms to which they are attached, form a five-membered heterocycle defined by the structure below when n is 1, or a six-membered heterocycle defined by the structure below when n is 2.

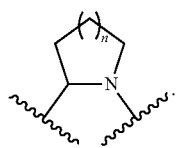

8. The membrane of claim 6, wherein the amino acid salt comprises a glycinate salt, a sarcosinate salt, or an aminoisobutyrate salt.

9. The membrane of claim 1, wherein the hydrophilic polymer comprises a polymer selected from the group consisting of polyvinylalcohol, polyvinylacetate, polyethylene oxide, polyvinylpyrrolidone, polyacrylamine, a polyamine polysiloxane, copolymers thereof, and blends thereof.

10. The membrane of claim 1, wherein the $CO_2$-philic ether is chosen from an alcohol ether, a polyalkylene alcohol ether, a polyalkylene glycol, a poly(oxyalkylene)glycol, a poly(oxyalkylene)glycol ether, an ethoxylated phenol, and combinations thereof.

11. The membrane of claim 1, wherein the selective polymer matrix further comprises a cross-linking agent selected from the group consisting of formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof.

12. The membrane of claim 1, wherein the graphene oxide has a carbon to oxygen ratio of from 3 to 20.

13. The membrane of claim 1, wherein the graphene oxide has a carbon to oxygen ratio of from 1 to 3.

14. The membrane of claim 1, wherein the selective polymer layer comprises from 0.01% to 5% by weight graphene oxide, based on the total dry weight of the selective polymer layer.

15. The membrane of claim 1, wherein the graphene oxide is nanoporous.

16. The membrane of claim 1, wherein the support layer comprises a gas permeable polymer chosen from polyamides, polyimides, polypyrrolones, polyesters, sulfone-based polymers, nitrile-based polymers, polymeric organosilicones, fluorinated polymers, polyolefins, copolymers thereof, and blends thereof.

17. The membrane of claim 1, wherein the selective polymer matrix has a $CO_2:H_2$ selectivity of from 50 to 500 at 107° C. and 31.7 bar feed pressure.

18. A method for separating a first gas from a feed gas stream, the method comprising contacting a membrane defined by claim 1 with the feed gas stream comprising the first gas under conditions effective to afford transmembrane permeation of the first gas.

19. The membrane of claim 9, wherein the hydrophilic polymer comprises polyallylamine, polyvinyl amine, polyethylenimine, a copolymer thereof, or a blend thereof.

* * * * *